(12) United States Patent
Mase et al.

(10) Patent No.: US 12,098,920 B2
(45) Date of Patent: Sep. 24, 2024

(54) OPTICAL COHERENCE TOMOGRAPHY DEVICE

(71) Applicant: HAMAMATSU PHOTONICS K.K., Hamamatsu (JP)

(72) Inventors: Mitsuhito Mase, Hamamatsu (JP); Masatoshi Fujimoto, Hamamatsu (JP); Tomofumi Suzuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 234 days.

(21) Appl. No.: 17/798,377

(22) PCT Filed: Jan. 21, 2021

(86) PCT No.: PCT/JP2021/002096
§ 371 (c)(1),
(2) Date: Aug. 9, 2022

(87) PCT Pub. No.: WO2021/166544
PCT Pub. Date: Aug. 26, 2021

(65) Prior Publication Data
US 2023/0083427 A1 Mar. 16, 2023

(30) Foreign Application Priority Data

Feb. 20, 2020 (JP) .................. 2020-027369
Aug. 5, 2020 (JP) .................. 2020-133011

(51) Int. Cl.
*G01B 9/02091* (2022.01)
*G01N 21/17* (2006.01)
(Continued)

(52) U.S. Cl.
CPC ......... *G01B 9/02091* (2013.01); *G01N 21/17* (2013.01); *H04N 25/10* (2023.01); *H04N 25/70* (2023.01); *G01N 2021/4761* (2013.01)

(58) Field of Classification Search
CPC ............ G01B 9/02041; G01B 9/02091; G01N 2021/4761; G01N 21/17; G01N 21/6408;
(Continued)

(56) References Cited

U.S. PATENT DOCUMENTS

2018/0156898 A1  6/2018 Suzuki et al.
2022/0059588 A1  2/2022 Lee et al.

FOREIGN PATENT DOCUMENTS

EP    1458087 A1    9/2004
JP    2005-114528 A    4/2005
(Continued)

OTHER PUBLICATIONS

International Preliminary Report on Patentability mailed Sep. 1, 2022 for PCT/JP2020/043043.
(Continued)

*Primary Examiner* — Tri T Ton
(74) *Attorney, Agent, or Firm* — Faegre Drinker Biddle & Reath LLP

(57) ABSTRACT

An optical coherence tomography device includes a light source, a mirror device including a movable mirror configured to perform a reciprocating operation, a support part configured to support an object, a beam splitter configured to generate interfering light, an optical sensor configured to detect the interfering light, and a control unit. Each of the plurality of pixels included in the optical sensor includes a light receiving part, a plurality of transfer gates, and a discharge gate. The control unit applies an electric signal to the optical sensor so that the plurality of transfer gates are sequentially brought into a charge transfer state in at least three time ranges separated from each other and the discharge gate is brought into a charge discharge state in a time range other than the at least three time ranges for each period of an interferogram signal of the interfering light.

7 Claims, 16 Drawing Sheets

(51) Int. Cl.
*H04N 25/10* (2023.01)
*H04N 25/70* (2023.01)
*G01N 21/47* (2006.01)

(58) Field of Classification Search
CPC ...... G01N 21/645; H04N 25/10; H04N 25/70; H04N 25/76; H04N 25/53; H04N 25/77; A47B 2096/207; A47B 87/00; A47B 95/04; A47B 96/20; A47B 97/00; G01S 17/89; G01S 7/4863; H01L 27/14612
See application file for complete search history.

(56) References Cited

FOREIGN PATENT DOCUMENTS

| JP | 2014-508922 A | 4/2014 |
|---|---|---|
| JP | 2015-215181 A | 12/2015 |
| JP | 2017-208812 A | 11/2017 |
| WO | WO-2012/103233 A1 | 8/2012 |
| WO | WO-2017/022220 A1 | 2/2017 |
| WO | WO-2020/008962 A1 | 1/2020 |

OTHER PUBLICATIONS

International Preliminary Report on Patentability mailed Sep. 1, 2022 for PCT/JP2021/002096.

Montgomery P C et al, "Towards real time 3D quantitative characterisation of in situ layer growth using white light interference microscopy", Journal of Physics: Conference Series, Institute of Physics Publishing, Bristol, GB, vol. 253, No. 1, Dec. 7, 2010, p. 12017, XP020200630, p. 1-p. 10.

Stephan Beer and Peter Seitz, "Real-Time Tomographic Imaging Without X-Rays: A Smart Pixel Array With Massively Parallel Signal Processing for Real-Time Optical Coherence Tomography Performing Close to the Physical Limits," Published in: Research in Microelectronics and Electronics, 2005 PhD, Date of Conference: Jul. 28-28, 2005, Date Added to IEEE Xplore: Dec. 12, 2005, Print ISBN: 0-7803-9345-7, DOI: 10.1109/RME.2005.1542955, Publisher: IEEE, Conference Location: Lausanne, Switzerland, p. 135-138, 2005.

(a)

(b)

(a)

(b)

(c)

(a)

(b)

(b)

(c)

OPTICAL COHERENCE TOMOGRAPHY DEVICE

TECHNICAL FIELD

The present disclosure relates to an optical coherence tomography device.

BACKGROUND ART

As an optical coherence tomography device, a device utilizing a method called time domain-optical coherence tomography (TD-OCT) is known (see, for example, Non-Patent Literature 1). In TD-OCT, light emitted from a light source is split into first light and second light, the first light is incident on a movable mirror, and the second light is incident on an object. At this time, interfering light is generated by combining the first light reflected by the movable mirror and the second light reflected by the object (specifically, the second light reflected or scattered inside or on a surface of the object) while translating the movable mirror in an optical axis direction, and an interferogram signal of the interfering light is acquired by detecting the generated interfering light. An image (tomographic image) of the object can be acquired by converting the acquired interferogram signal into an envelope curve thereof and regarding the converted envelope curve of the interferogram signal as a structure of the object in a depth direction.

CITATION LIST

Patent Literature

[Non-Patent Literature 1] Stephan Beer and Peter Seitz, "REAL-TIME TOMOGRAPHIC IMAGING WITHOUT X-RAYS: A SMART PIXEL ARRAY WITH MASSIVELY PARALLEL SIGNAL PROCESSING FOR REAL-TIME OPTICAL COHERENCE TOMOGRAPHY PERFORMING CLOSE TO THE PHYSICAL LIMITS", Published in: Research in Microelectronics and Electronics, 2005 PhD, Date of Conference: 28-28 Jul. 2005, Date Added to IEEE Xplore: 12 Dec. 2005, Print ISBN: 0-7803-9345-7, DOI: 10.1109/RTVIE.2005.1542955, Publisher: IEEE, Conference Location: Lausanne, Switzerland, Page: 135-138

SUMMARY OF INVENTION

Technical Problem

In the optical coherence tomography device as described above, it is important to accurately acquire an envelope curve of an interferogram signal of interfering light in generating an image of an object with high accuracy.

An objective of the present disclosure is to provide an optical coherence tomography device capable of acquiring an envelope curve of an interferogram signal of interfering light with high accuracy.

Solution to Problem

An optical coherence tomography device of one aspect of the present disclosure includes a light source, a mirror device including a movable mirror configured to perform a reciprocating operation, a support part configured to support an object, a beam splitter configured to generate interfering light by splitting light emitted from the light source into first light and second light and combining the first light reflected by the movable mirror and the second light reflected by the object, an optical sensor configured to detect the interfering light generated by the beam splitter, and a control unit electrically connected to at least the optical sensor, in which the optical sensor has a plurality of pixels, each of the plurality of pixels includes a light receiving part configured to generate electric charge due to incident light, a plurality of transfer gates configured to transfer the electric charge generated in the light receiving part, and a discharge gate configured to discharge the electric charge generated in the light receiving part, and the control unit applies an electric signal to the optical sensor so that the plurality of transfer gates are sequentially brought into a charge transfer state in at least three time ranges separated from each other and the discharge gate is brought into a charge discharge state in a time range other than the at least three time ranges for each period of an interferogram signal of the interfering light.

In the optical coherence tomography device, when the movable mirror is reciprocated, a temporal change of the interferogram signal is made periodic, and conversion of the interferogram signal into an envelope curve is facilitated. Then, in each of the plurality of pixels included in the optical sensor, the plurality of transfer gates are sequentially brought into the charge transfer state in at least three time ranges separated from each other and the discharge gate is brought into the charge discharge state in a time range other than the at least three time ranges for each period of the interferogram signal of the interfering light. Thereby, only the electric charge generated in the light receiving part can be acquired as a signal charge in each of the at least three time ranges. Therefore, according to the optical coherence tomography device, an envelope curve of an interferogram signal of interfering light can be acquired with high accuracy even when, for example, a speed of the reciprocating operation of the movable mirror is not constant, or an acquisition of electric charge is not performed at regular time intervals, In the optical coherence tomography device of one aspect of the present disclosure, the movable mirror may be configured to perform a reciprocating operation by resonating in the mirror device. According to this, an interferogram signal of interfering light can be acquired at high speed. Also, a speed of the reciprocating operation of the movable mirror does not become constant due to the resonance operation of the movable mirror, but even in that case, an envelope curve of an interferogram signal of interfering light can be acquired with high accuracy as described above.

In the optical coherence tomography device of one aspect of the present disclosure, the movable mirror may be configured to perform a reciprocating operation at a frequency of 1 kHz or higher. According to this, an interferogram signal of interfering light can be acquired at high speed. Also, when the movable mirror performs the reciprocating operation at a frequency of 1 kHz or higher, a speed of the reciprocating operation of the movable mirror does not easily become constant, but even in that case, an envelope curve of an interferogram signal of interfering light can be acquired with high accuracy as described above.

In the optical coherence tomography device of one aspect of the present disclosure, the plurality of pixels may be disposed two-dimensionally. According to this, an image of a predetermined region of the object can be generated at once.

In the optical coherence tomography device of one aspect of the present disclosure, the mirror device may be a MEMS mirror device. According to this, the movable mirror can be reciprocated at high speed.

In the optical coherence tomography device of one aspect of the present disclosure, each of the plurality of pixels may further include a photogate electrode configured to attract the electric charge generated in the light receiving part to the plurality of transfer gates and the discharge gate side. According to this, since the electric charge generated in the light receiving part can be transferred and discharged at high speed, an image of the object can be generated in a short period of time.

In the optical coherence tomography device of one aspect of the present disclosure, each of the at least three time ranges may be a time range centered on a time at which a phase of the interferogram signal is shifted by $\pi/2$. According to this, a calculation for converting an interferogram signal of interfering light into an envelope curve thereof can be simplified. Due to simplification of the calculation, some or all of the calculation can be realized by hardware, and this can contribute to overall high-speed processing.

Advantageous Effects of Invention

According to the present disclosure, it is possible to provide an optical coherence tomography device capable of acquiring an envelope curve of an interferogram signal of interfering light with high accuracy.

DESCRIPTION OF EMBODIMENTS

Hereinafter, an embodiment of the present disclosure will be described in detail with reference to the drawings. In each of the drawings, the same or corresponding portions are denoted by the same reference signs, and duplicate descriptions thereof will be omitted.

[Configuration of Optical Coherence Tomography Device]

Figure 1:
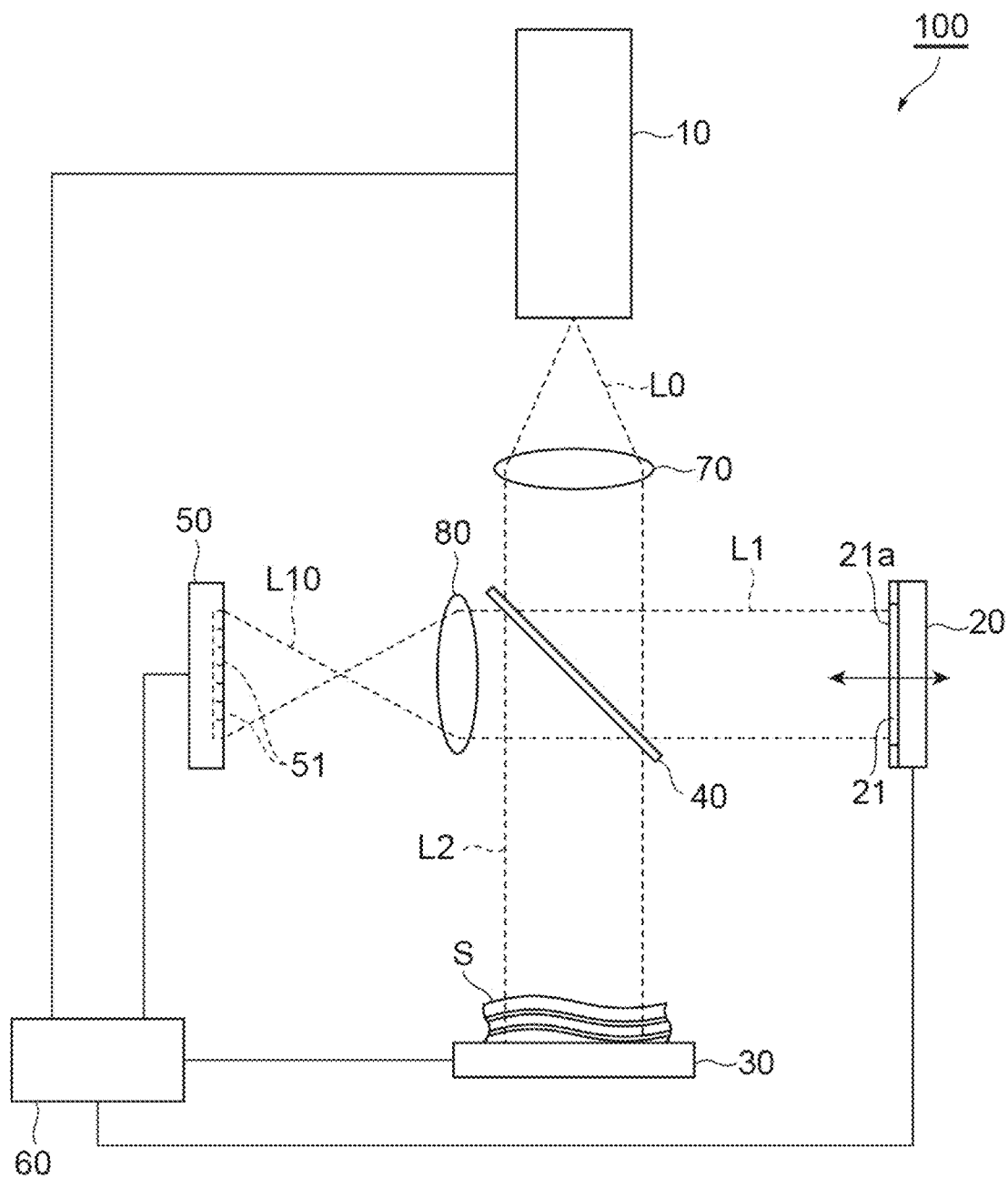
FIG. 1 is a configuration view of an optical coherence tomography device of one embodiment.

FIG. 1 is a configuration view of an optical coherence tomography device of one embodiment. An optical coherence tomography device 100 illustrated in FIG. 1 is a device utilizing TD-OCT. The optical coherence tomography device 100 includes a light source 10, a mirror device 20, a support part 30, a beam splitter 40, an optical sensor 50, and a control unit 60.

The light source 10 emits a light L0 which is low-coherent light. The light source 10 is a super luminescent diode (SLD) that emits light having, for example, a center wavelength of 650 nm and a coherence length of 20 μm.

The mirror device 20 includes a movable mirror 21. The movable mirror 21 reciprocates in a direction perpendicular to a mirror surface 21a of the movable mirror 21.

The support part 30 supports an object S. The support part 30 is, for example, a belt conveyor that conveys the object S. The object S may be, for example, a transparent plastic film for packaging.

The beam splitter 40 generates a interfering light L10 by splitting the light L0 emitted from the light source 10 into a first light L1 and a second light L2, and combining the first light L1 reflected by the movable mirror 21 and the second light L2 reflected by the object S (specifically, the second light L2 reflected or scattered inside or on a surface of the object S).

The optical sensor 50 detects the interfering light L10 generated by the beam splitter 40. The optical sensor 50 includes a plurality of pixels 51 and a CMOS reading circuit (not illustrated). The plurality of pixels 51 are disposed two-dimensionally. The plurality of pixels 51 and the CMOS reading circuit (not illustrated) are monolithically formed on a semiconductor substrate (for example, a silicon substrate).

The control unit 60 is electrically connected to each of the light source 10, the mirror device 20, the support part 30, and the optical sensor 50. The control unit 60 has a function as a signal generation unit that generates an electric signal for operating each part and applies the electric signal to each part, and a function as a signal processing unit that processes an electric signal output from the optical sensor 50. The control unit 60 includes, for example, an integrated circuit such as a field-programmable gate array (FPGA), a non-volatile memory such as an electrically erasable programmable read-only memory (EEPROM), a personal computer (PC), and the like.

In the present embodiment, the light L0 emitted from the light source 10 is collimated by a collimating lens 70 and is incident on the beam splitter 40. Of the light L0 incident on the beam splitter 40, the first light L1 is reflected by the beam splitter 40 to be incident on the movable mirror 21, and is reflected by the movable mirror 21 to be incident on the beam splitter 40. Of the light L0 incident on the beam splitter 40, the second light L2 passes through the beam splitter 40 to be incident on the object S, and is reflected by the object S to be incident on the beam splitter 40.

The first light L1 incident on the beam splitter 40 passes through the beam splitter 40. The second light L2 incident on the beam splitter 40 is reflected by the beam splitter 40. The interfering light L10 of the first light L1 and the second light L2 generated thereby is incident on each pixel 51 of the optical sensor 50 via a relay lens 80. The relay lens 80 is configured by a lens disposed between the beam splitter 40 and the optical sensor 50, and forms a real image of the object S on the plurality of pixels 51.

Further, the relay lens 80 may be configured by a lens disposed between the beam splitter 40 and the support part 30. Alternatively, the relay lens 80 may be configured by a lens disposed between the beam splitter 40 and the optical sensor 50 and a lens disposed between the beam splitter 40 and the support part 30. Also, a condenser lens may be disposed between the beam splitter 40 and the mirror device 20. This is effective when a diameter of the mirror surface 21a of the movable mirror 21 is small. Also, the support part 30 may be disposed at a position of the mirror device 20 illustrated in FIG. 1, and the mirror device 20 may be disposed at a position of the support part 30 illustrated in FIG. 1.

[Configuration of Mirror Device]

Figure 2:
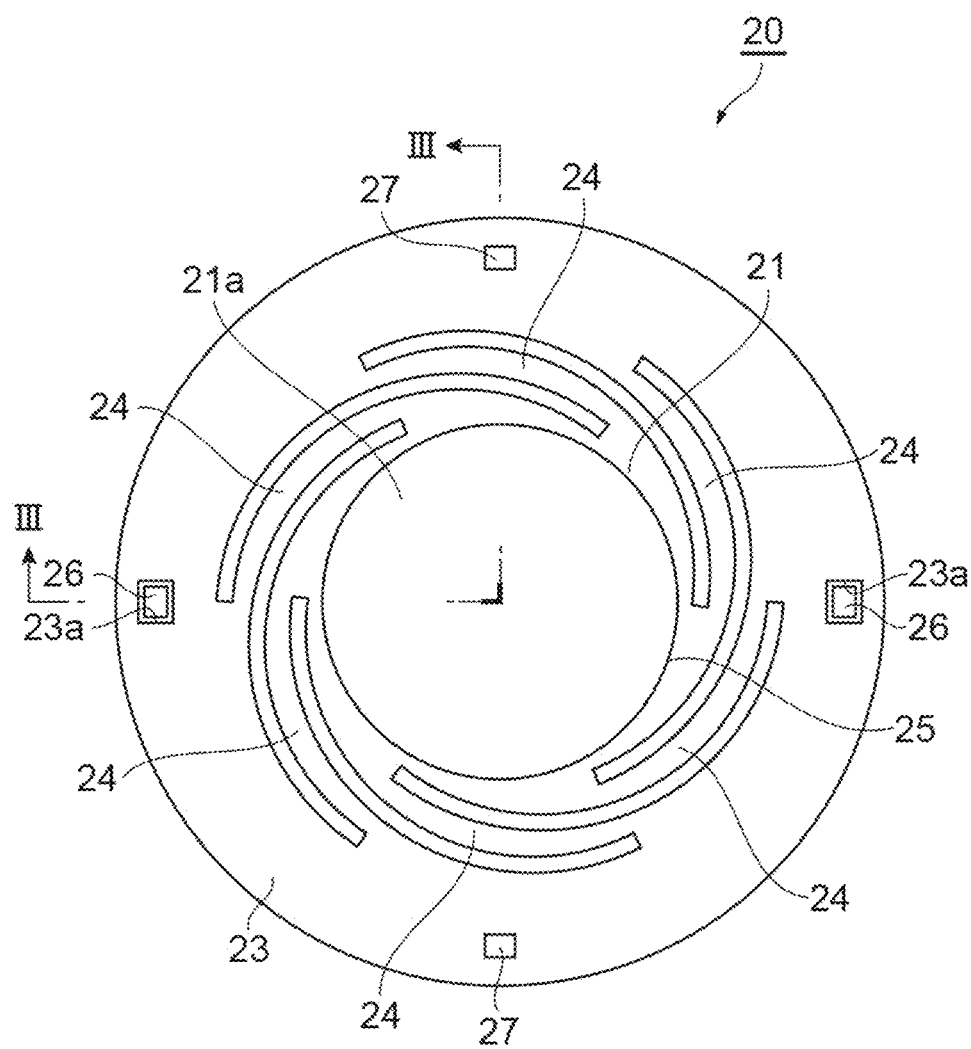
FIG. 2 is a plan view of a mirror device illustrated in FIG. 1.

FIG. 2 is a plan view of the mirror device 20 illustrated in FIG. 1.

Figure 3:
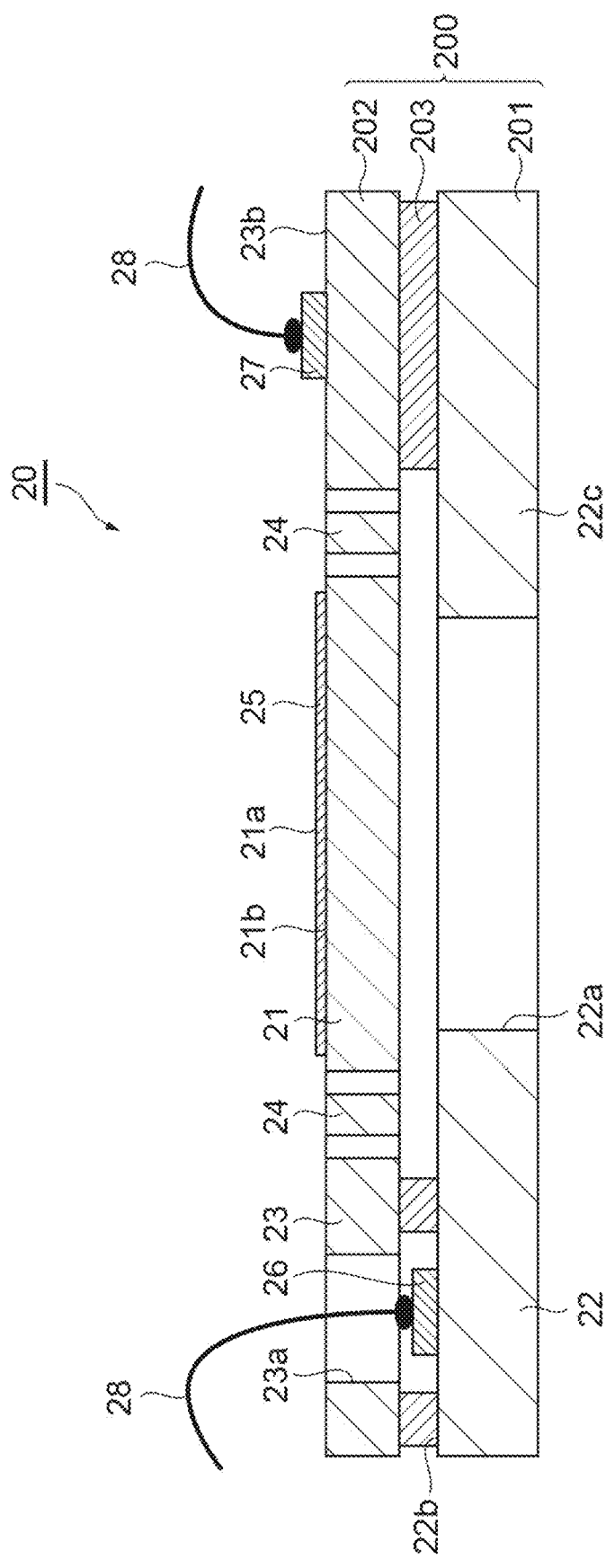
FIG. 3 is a cross-sectional view of the mirror device along line III-III illustrated in FIG. 2.

FIG. 3 is a cross-sectional view of the mirror device 20 along line III-III illustrated in FIG. 2. As illustrated in FIGS. 2 and 3, the mirror device 20 includes a base 22, a frame part 23, and a plurality of elastic support parts 24 in addition to the movable mirror 21. The movable mirror 21, the base 22, the frame part 23, and the plurality of elastic support parts 24 are configured by a silicon on insulator (SOI) substrate 200. That is, the mirror device 20 is a micro electro mechanical systems (MEMS) mirror device. The SOI substrate 200 includes a support layer 201, a device layer 202, and an intermediate layer 203. The support layer 201 and the device layer 202 are semiconductor layers (for example, silicon layers).

The intermediate layer 203 is an insulating layer (for example, a silicon oxide layer) disposed between the support layer 201 and the device layer 202.

The base 22 is formed by the support layer 201 and has, for example, a disc shape. The base 22 has an opening 22a. The opening 22a has, for example, a circular shape centered on a center of the base 22 when viewed from a thickness direction of the base 22. A thickness of the base 22 may be, for example, about 320 µm.

The frame part 23 is formed by the device layer 202 and has, for example, an annular shape. The frame part 23 is disposed on a surface 22b of the base 22 on the intermediate layer 203 side via the intermediate layer 203. A thickness of the frame part 23 may be, for example, about 30 µm. A thickness of the intermediate layer 203 may be, for example, about 1.5 µm.

The movable mirror 21 is formed by the device layer 202 and has, for example, a disc shape. The movable mirror 21 is disposed on an inner side of the frame part 23 and faces the opening 22a in the thickness direction of the base 22. A metal film 25 forming the mirror surface 21a is disposed on a surface 21b of the movable mirror 21 on a side opposite to the opening 22a. A thickness of the movable mirror 21 may be, for example, about 30 µm. A diameter of the movable mirror 21 may be, for example, about 500 µm.

The plurality of elastic support parts 24 are formed by the device layer 202. Each of the elastic support parts 24 has, for example, an arc shape centered on the center of the base 22 when viewed from the thickness direction of the base 22. Each elastic support part 24 is disposed between the frame part 23 and the movable mirror 21. One end of each elastic support part 24 is connected to the frame part 23, and the other end of each elastic support part 24 is connected to the movable mirror 21. Each elastic support part 24 faces a peripheral portion 22c of the opening 22a in the base 22 in the thickness direction of the base 22.

A gap is formed between each elastic support part 24 and the peripheral portion 22c.

A pair of electrode pads 26 are disposed on the surface 22b of the base 22. Each of the electrode pads 26 is positioned in an opening 23a formed in the frame part 23 and the intermediate layer 203 so that the surface 22b of the base 22 is exposed. A pair of electrode pads 27 are disposed on a surface 23b of the frame part 23 on a side opposite to the intermediate layer 203. The pair of electrode pads 26 and the pair of electrode pads 27 are disposed at intervals of 90 degrees centered on the center of the base 22 so that the electrode pads 26 and the electrode pads 27 are alternately aligned when viewed from the thickness direction of the base 22. A wire 28 electrically connected to the control unit 60 (see FIG. 1) is connected to each of the electrode pads 26 and 27.

In the mirror device 20 configured as described above, when an electric signal is applied to each of the electrode pads 26 and 27 from the control unit 60 (see FIG. 1) via the wire 28, an electrostatic force is periodically generated between each elastic support part 24 and the peripheral portion 22c. Thereby, each elastic support part 24 is elastically deformed periodically, and the movable mirror 21 reciprocates in a direction perpendicular to the mirror surface 21a. The movable mirror 21 performs a reciprocating operation at a frequency of 1 kHz or more (for example, 100 kHz) by resonating in the mirror device 20.

[Configuration of Optical Sensor]

Figure 4:
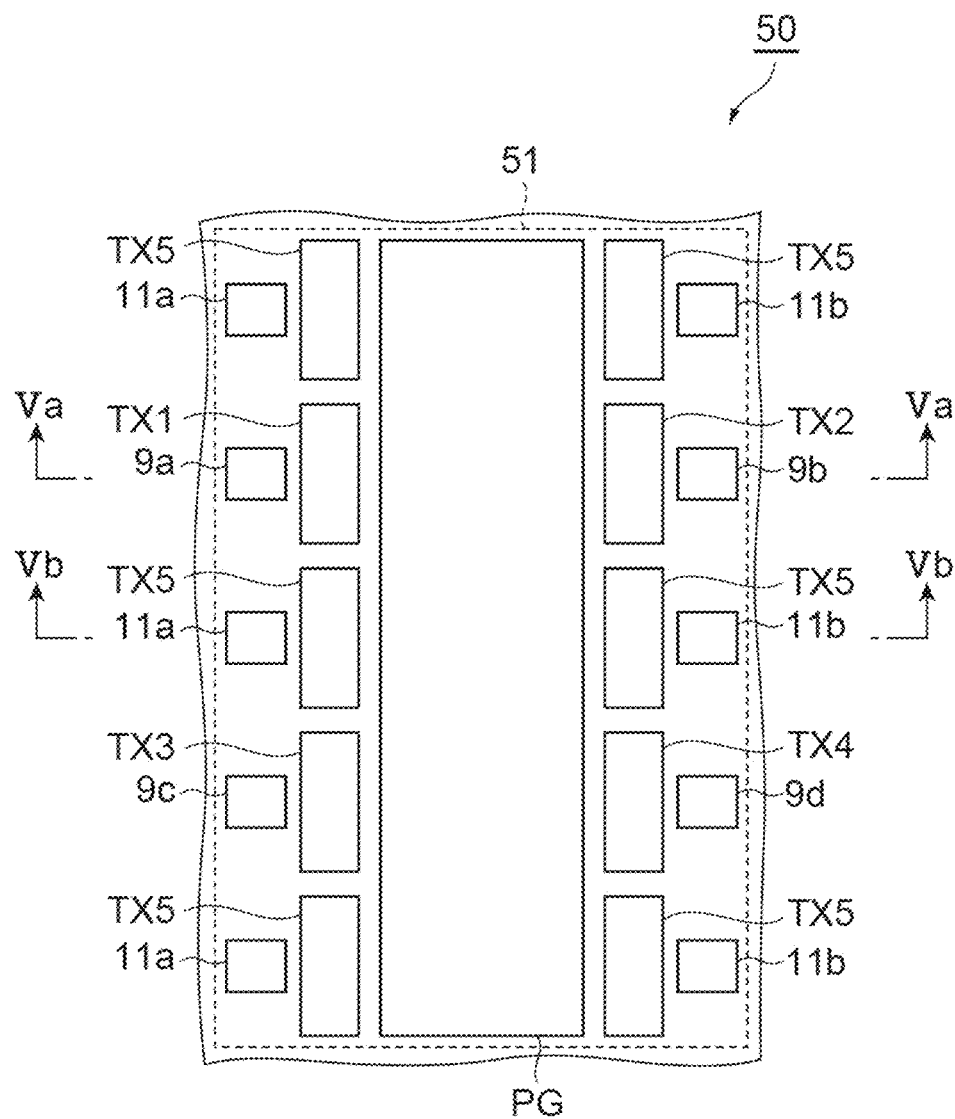
FIG. 4 is a plan view of a pixel of an optical sensor illustrated in FIG. 1.
Figure 5:
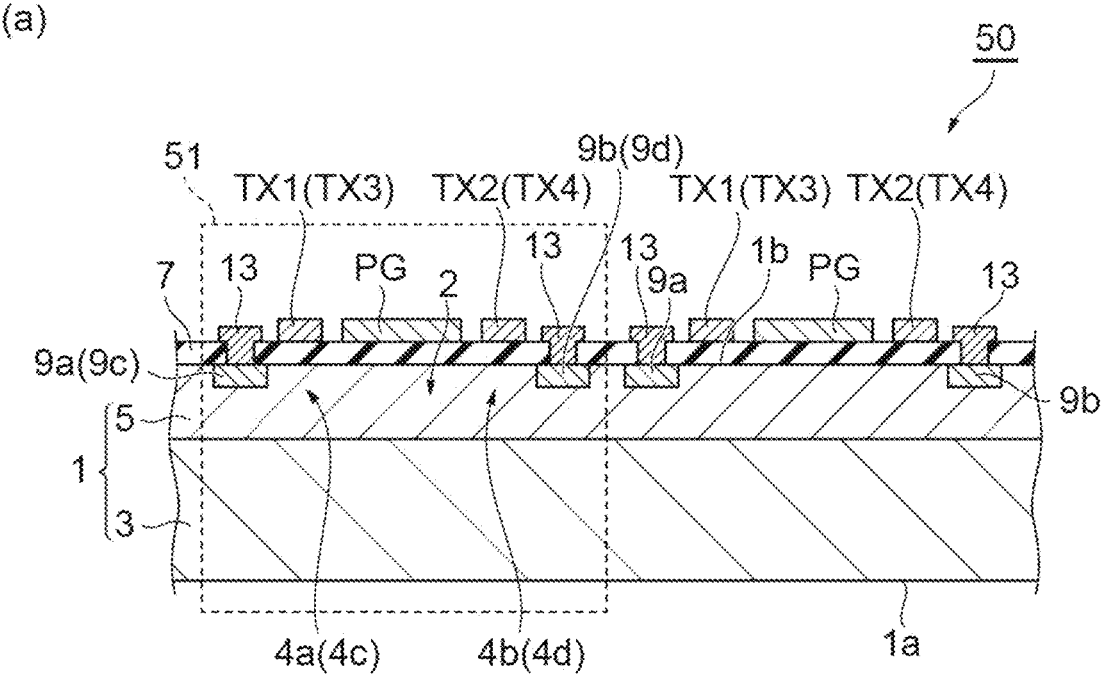
FIG. 5 is a cross-sectional view of the pixel illustrated in FIG. 4.
Figure 5:
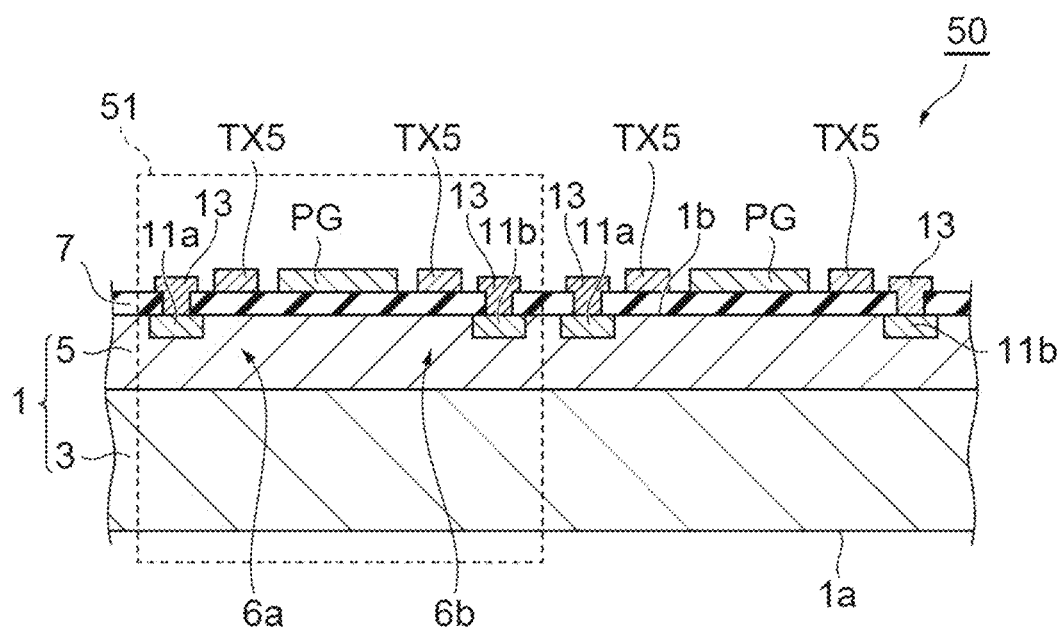

FIG. 4 is a plan view of the pixel 51 of the optical sensor 50 illustrated in FIG. 1. (a) of FIG. 5 is a cross-sectional view of the pixel 51 along line Va-Va illustrated in FIG. 4, and (b) of FIG. 5 is a cross-sectional view of the pixel 51 along line Vb-Vb illustrated in FIG. 4. As illustrated in FIGS. 4 and 5, the optical sensor 50 includes a semiconductor substrate 1 having a first main surface 1a and a second main surface 1b facing each other. The semiconductor substrate 1 includes a p-type first semiconductor region 3 positioned on the first main surface 1a side and a p⁻-type second semiconductor region 5 having a lower impurity concentration than the first semiconductor region 3 and positioned on the second main surface 1b side. The semiconductor substrate 1 can be obtained, for example, by growing a p⁻-type epitaxial layer having a lower impurity concentration than a p-type semiconductor substrate on the p-type semiconductor substrate. An insulating layer 7 is formed on the second main surface 1b (the second semiconductor region 5) of the semiconductor substrate 1.

A photogate electrode PG is disposed on the insulating layer 7. The photogate electrode PG has, for example, a rectangular shape in a plan view. A region corresponding to the photogate electrode PG (a region positioned below the photogate electrode PG in FIG. 5) in the semiconductor substrate 1 (the second semiconductor region 5) functions as a light receiving part 2 that generates electric charge due to the incident light. That is, the optical sensor 50 includes a plurality of light receiving parts 2 disposed two-dimensionally.

In the second semiconductor region 5, n-type third semiconductor regions 9a and 9b having a high impurity concentration are formed to face each other in regions positioned away from the photogate electrode PG. The third semiconductor region 9a is a first charge accumulation part for accumulating the electric charge generated in the light receiving part 2, and the third semiconductor region 9b is a second charge accumulation part for accumulating the electric charge generated in the light receiving part 2. The third semiconductor regions 9a and 9b are disposed to face each other with the photogate electrode PG interposed therebetween. The third semiconductor regions 9a and 9b have, for example, a square shape in a plan view.

In the second semiconductor region 5, n-type third semiconductor regions 9c and 9d having a high impurity concentration are formed to face each other in regions positioned away from the photogate electrode PG. The third semiconductor region 9c is a third charge accumulation part for accumulating the electric charge generated in the light receiving part 2, and the third semiconductor region 9d is a fourth charge accumulation part for accumulating the electric charge generated in the light receiving part 2. The third semiconductor regions 9c and 9d are disposed to face each other with the photogate electrode PG interposed therebetween. The third semiconductor regions 9c and 9d have, for example, a square shape in a plan view.

The third semiconductor regions 9a and 9c are disposed to face each other with a fourth semiconductor region 11a to be described later interposed therebetween. The third semiconductor regions 9b and 9d are disposed to face each other with a fourth semiconductor region 11b to be described later interposed therebetween.

In the second semiconductor region 5, the n-type fourth semiconductor regions 11a and 11b having a high impurity concentration are formed in regions positioned away from the photogate electrode PG. The fourth semiconductor regions 11a and 11b are charge discharge parts for discharging the electric charge generated by the light receiving part 2 to the outside. In the present embodiment, three pairs of the fourth semiconductor regions 11a and 11b are disposed for the photogate electrode PG. The fourth semiconductor regions 11a and 11b are disposed to face each other with the photogate electrode PG interposed therebetween. The fourth semiconductor regions 11a and 11b have, for example, a square shape in a plan view.

Further, in the present embodiment, "an impurity concentration is high" means that, for example, an impurity concentration is about $1 \times 10^{17}$ cm$^{-3}$ or higher, and "+" is appended as a conductive type thereof. On the other hand, "an impurity concentration is low" means that, for example, an impurity concentration is about $10 \times 10^{15}$ cm$^{-3}$ or lower, and "−" is appended as a conductive type thereof. A thickness/impurity concentration of each semiconductor region is as follows. A thickness of the first semiconductor region 3: 10 to 1000 μm/impurity concentration: $1 \times 10^{12}$ cm$^{-3}$ to $1 \times 10^{19}$ cm$^{-3}$. A thickness of the second semiconductor region 5: 1 to 50 μm/impurity concentration: $1 \times 10^{12}$ cm$^{-3}$ to $1 \times 10^{15}$ cm$^{-3}$. Thicknesses of the third semiconductor regions 9a and 9b and the fourth semiconductor regions 11a and 11b: 0.1 to 1 μm/impurity concentration: $1 \times 10^{18}$ cm$^{-3}$ to $1 \times 10^{20}$ cm$^{-3}$.

A reference potential such as a ground potential is applied to the semiconductor substrate 1 (the first semiconductor region 3 and the second semiconductor region 5) via a back gate, a through electrode, or the like.

A transfer electrode TX1, a transfer electrode TX2, a transfer electrode TX3, and a transfer electrode TX4 are disposed on the insulating layer 7 to correspond to the photogate electrode PG. The transfer electrode TX1 is positioned between the photogate electrode PG and the third semiconductor region 9a, and is disposed away from the photogate electrode PG. The transfer electrode TX2 is positioned between the photogate electrode PG and the third semiconductor region 9b, and is disposed away from the photogate electrode PG. The transfer electrode TX3 is positioned between the photogate electrode PG and the third semiconductor region 9c, and is disposed away from the photogate electrode PG. The transfer electrode TX4 is positioned between the photogate electrode PG and the third semiconductor region 9d, and is disposed away from the photogate electrode PG. The transfer electrodes TX1 to TX4 have, for example, a rectangular shape in a plan view.

A region of the semiconductor substrate 1 (the second semiconductor region 5) corresponding to the transfer electrode TX1 (a region positioned below the transfer electrode TX1 in FIG. 5) functions as a transfer gate 4a for transferring electric charge generated in the light receiving part 2 to the third semiconductor region 9a which is the first charge accumulation part. A region of the semiconductor substrate 1 (the second semiconductor region 5) corresponding to the transfer electrode TX2 (a region positioned below the transfer electrode TX2 in FIG. 5) functions as a transfer gate 4b for transferring electric charge generated in the light receiving part 2 to the third semiconductor region 9b which is the second charge accumulation part.

A region of the semiconductor substrate 1 (the second semiconductor region 5) corresponding to the transfer electrode TX3 (a region positioned below the transfer electrode TX3 in FIG. 5) functions as a transfer gate 4c for transferring electric charge generated in the light receiving part 2 to the third semiconductor region 9c which is the third charge accumulation part. A region of the semiconductor substrate 1 (the second semiconductor region 5) corresponding to the transfer electrode TX4 (a region positioned below the transfer electrode TX4 in FIG. 5) functions as a transfer gate 4d for transferring electric charge generated in the light receiving part 2 to the third semiconductor region 9d which is the fourth charge accumulation part.

A plurality (here, six) of transfer electrodes TX5 are disposed on the insulating layer 7 to correspond to the photogate electrode PG.

Some of the plurality of transfer electrodes TX5 on one side of the photogate electrode PG are each positioned between the photogate electrode PG and the fourth semiconductor region 11a, and are disposed away from the photogate electrode PG with the transfer electrode TX1 and the transfer electrode TX3 interposed therebetween. The remainder of the plurality of transfer electrodes TX5 on the other side of the photogate electrode PG are each positioned between the photogate electrode PG and the fourth semiconductor region 11b, and are disposed away from the photogate electrode PG with the transfer electrode TX2 and the transfer electrode TX4 interposed therebetween. The transfer electrode TX5 has, for example, a rectangular shape in a plan view.

A region of the semiconductor substrate 1 (the second semiconductor region 5) corresponding to the transfer electrode TX5 on the one side (a region positioned below the transfer electrode TX5 on the one side in FIG. 5) functions as a discharge gate 6a for transferring electric charge generated in the light receiving part 2 to the fourth semiconductor region 11a which is the charge discharge part. A region of the semiconductor substrate 1 (the second semiconductor region 5) corresponding to the transfer electrode TX5 on the other side (a region positioned below the transfer electrode TX5 on the other side in FIG. 5) functions as a discharge gate 6b for transferring electric charge generated in the light receiving part 2 to the fourth semiconductor region 11b which is the charge discharge part. As described above, the discharge gates 6a and 6b are for discharging electric charge generated in the light receiving part 2.

Further, a length dimension of each of the transfer electrodes TX1 to TX5 in a direction facing the photogate electrode PG, that is, a gate width of each of the transfer electrodes TX1 to TX5 is determined according to a transferable distance of signal charge and unnecessary charge so that a region of the photogate electrode PG that allows high-speed transfer of the signal charge and the unnecessary charge is covered in each of the transfer electrodes TX1 to TX5.

A contact hole for exposing a surface of the first semiconductor region 3 is provided in the insulating layer 7. A conductor 13 for connecting each of the third semiconductor regions 9a to 9d and each of the fourth semiconductor regions 11a and 11b to the outside are disposed in the contact hole. The semiconductor substrate is formed of Si as an example, and the insulating layer 7 is formed of $SiO_2$ as an example. The photogate electrode PG and the transfer electrodes TX1 to TX5 are formed of polysilicon as an example. Further, other materials may be used for those described above.

As described above, the third semiconductor regions 9a to 9d are for accumulating electric charge generated in the light receiving part 2 due to the incident light. Phases of charge transfer signals applied to the transfer electrodes TX1 to TX4 are different from each other. Light incident on one pixel 51 is converted into electric charge in the light receiving part 2, and the electric charge generated in the light receiving part 2 is attracted to the transfer gates 4a to 4d and the discharge gates 6a and 6b side by the photogate electrode PG to which a voltage is applied. The attracted charge travels in directions of the transfer electrodes TX1 to TX4 as signal charge according to a potential energy gradient formed due to the voltages applied to the photogate electrode PG and the transfer electrodes TX1 to TX4.

When a positive potential is applied to the transfer electrodes TX1 to TX4, potential energies below the transfer electrodes TX1 to TX4 become lower than potential energies of the semiconductor substrate 1 (the second semiconductor region 5) at portions below the photogate electrode PG with respect to electrons, and negative charge (electron) is pulled in directions of the transfer electrodes TX1 to TX4 and are accumulated in potential energy wells formed by the third semiconductor regions 9a to 9d.

An n-type semiconductor contains a positively ionized donor, has a positive potential energy, and attracts electrons. When an electric potential (ground potential) lower than the above-described positive potential is applied to the transfer electrodes TX1 to TX4, potential energy barriers due to the transfer electrodes TX1 to TX4 are generated, and electric charge generated in the semiconductor substrate 1 is not pulled into the third semiconductor regions 9a to 9d.

The fourth semiconductor regions 11a and 11b are for collecting unnecessary charge generated in the light receiving part 2 due to the incident light and discharging them to the outside. The light incident on one pixel 51 is converted into electric charge in the light receiving part 2, and the electric charge generated in the light receiving part 2 is attracted to the transfer gates 4a to 4d and the discharge gates 6a and 6b side by the photogate electrode PG to which a voltage is applied. The attracted charge travels in directions of the transfer electrodes TX5 as unnecessary charge according to a potential energy gradient formed due to the voltages applied to the photogate electrode PG and the transfer electrodes TX5.

When a positive potential is applied to the transfer electrodes TX5, potential energies below the transfer electrodes TX5 become lower than potential energies of the semiconductor substrate 1 (the second semiconductor region 5) at portions below the photogate electrode PG with respect to electrons, and negative charge (electrons) is pulled in directions of the transfer electrodes TX5 and are accumulated in potential energy wells formed by the fourth semiconductor regions 11a to 11b. When an electric potential (ground potential) lower than the above-described positive potential is applied to the transfer electrodes TX5, potential energy barriers due to the transfer electrodes TX5 are generated, and electric charge generated in the semiconductor substrate 1 is not pulled into the fourth semiconductor regions 11a to 11b.

Figure 6:
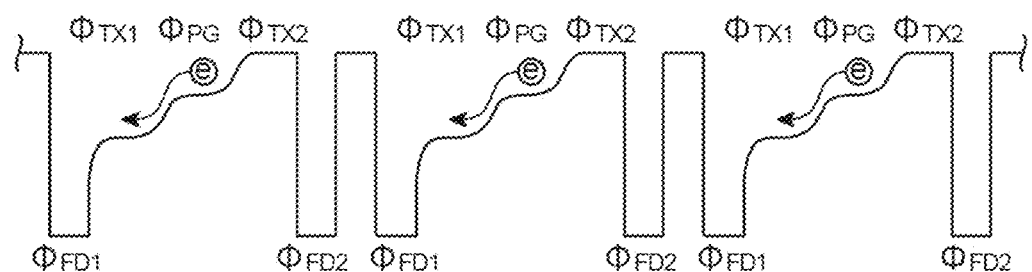
FIG. 6 is a potential energy distribution diagram for explaining an accumulation operation of signal charge.
Figure 6:
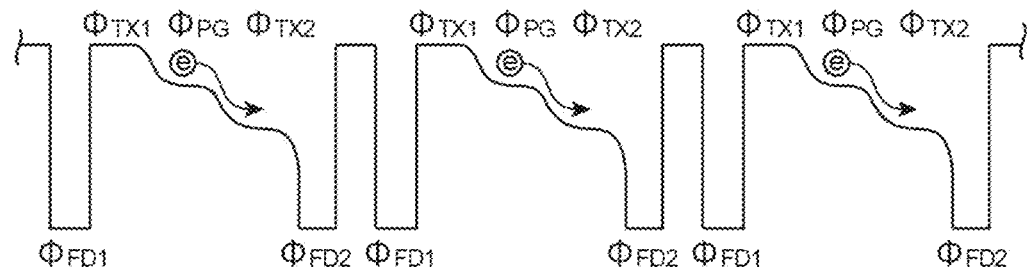
Figure 6:
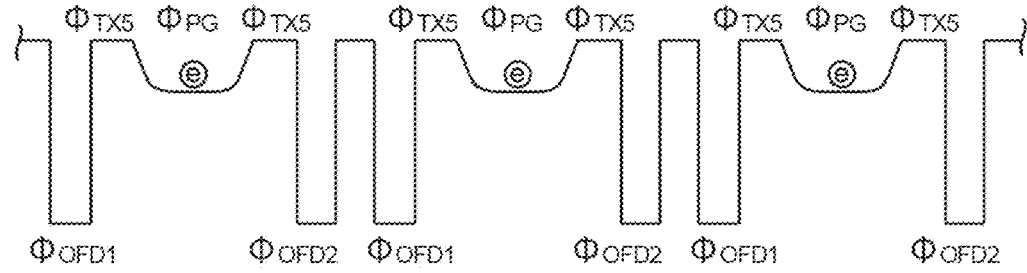
Figure 7:
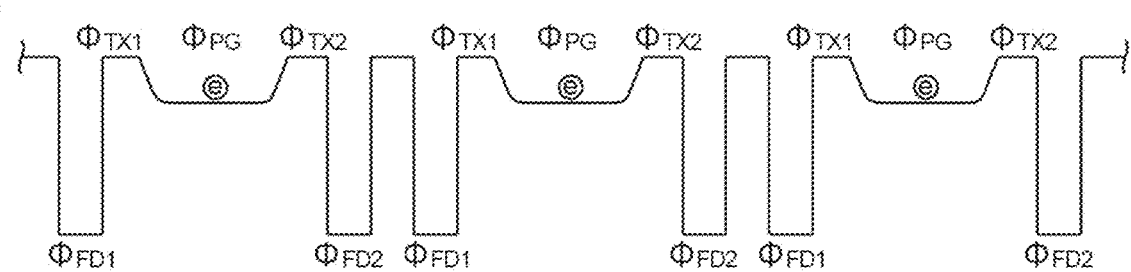
FIG. 7 is a potential energy distribution diagram for explaining a discharge operation of unnecessary charge.
Figure 7:
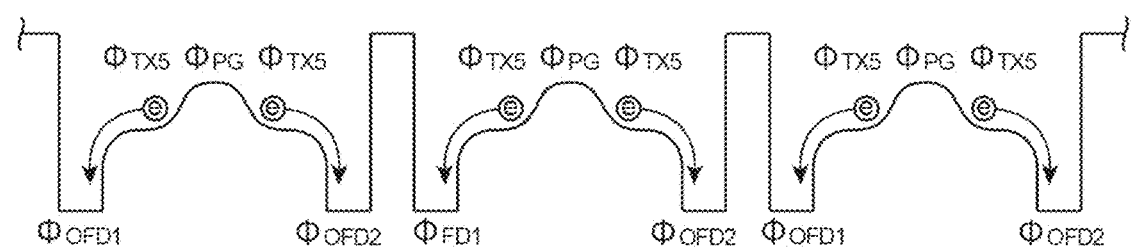

FIG. 6 is a diagram showing "a potential energy distribution in the vicinity of the second main surface 1b of the semiconductor substrate 1" for explaining an accumulation operation of signal charge. FIG. 7 is a diagram showing "a potential energy distribution in the vicinity of the second main surface 1b of the semiconductor substrate 1" for explaining a discharge operation of unnecessary charge. In FIGS. 6 and 7, a downward direction is a positive direction of a potential energy. In FIG. 6, (a) and (b) show potential energy distributions in a transverse direction of the cross section of FIG. 4 in the transverse direction, and (c) shows a potential energy distribution in a transverse direction of the cross section of FIG. 5 in the transverse direction. In FIG. 7, (a) shows a potential energy distribution in a transverse direction of the cross section of FIG. 4 in the transverse direction, and (b) shows a potential energy distribution in a transverse direction of the cross section of FIG. 5 in the transverse direction.

FIGS. 6 and 7 show a potential energy $\phi_{TX1}$ in a region (the transfer gate 4a) just below the transfer electrode TX1, a potential energy $\phi_{TX2}$ in a region (the transfer gate 4b) just below the transfer electrode TX2, a potential energy $\phi_{TX5}$ in a region (the discharge gates 6a and 6b) just below the transfer electrode TX5, a potential energy $\phi_{PG}$ of the light receiving part 2 just below the photogate electrode PG, a potential energy $\phi_{FD1}$ of the third semiconductor region 9a, a potential energy $\phi_{FD2}$ of the third semiconductor region 9b, a potential energy $\phi_{OFD1}$ of the fourth semiconductor region 11a, and a potential energy $\phi_{OFD2}$ of the fourth semiconductor region 11b.

When the potential energies ($\phi_{TX1}$, $\phi_{TX2}$, and $\phi_{TX5}$) in the regions just below the transfer electrodes TX1 and TX2 and the transfer electrode TX5 which are adjacent to the photogate electrode PG at the time of no bias are set as a reference potential, the potential energy $\phi_{PG}$ of the light receiving part 2 just below the photogate electrode PG is set higher than the reference potential. The potential energy $\phi_{PG}$ of the light receiving part 2 is higher than the potential energies $\phi_{TX1}$, $\phi_{TX2}$, and $\phi_{TX5}$, and a potential energy distribution in this region has a downwardly concave shape in the drawing.

An accumulation operation of signal charge will be described with reference to FIG. 6. When a phase of the charge transfer signal applied to the transfer electrode TX1 is 0 degrees, a positive potential is applied to the transfer electrode TX1, and an electric potential of a reverse phase, that is, an electric potential having a phase of 180 degrees (ground potential) is applied to the transfer electrode TX2. In this case, as shown in (a) of FIG. 6, negative charge e generated in the light receiving part 2 flows into the potential energy well of the third semiconductor region 9a due to the potential energy $\phi_{TX1}$ of the region just below the transfer electrode TX1 being lowered.

On the other hand, the potential energy $\phi_{TX2}$ of the region just below the transfer electrode TX2 is not lowered, and electric charge does not flow into the potential energy well of the third semiconductor region 9b. In the third semiconductor regions 9a and 9b, since n-type impurities are added, the potential energy is recessed in a positive direction.

When a phase of the charge transfer signal applied to the transfer electrode TX2 is 0 degrees, a positive potential is applied to the transfer electrode TX2, and an electric potential of a reverse phase, that is, an electric potential having a phase of 180 degrees (ground potential) is applied to the transfer electrode TX1. In this case, as shown in (b) of FIG. 6, negative charge e generated in the light receiving part 2 flows into the potential energy well of the third semiconductor region 9b due to the potential energy $\phi_{TX2}$ of the region just below the transfer electrode TX2 being lowered. On the other hand, the potential energy $\phi_{TX1}$ of the region just below the transfer electrode TX1 is not lowered, and electric charge does not flow into the potential energy well of the third semiconductor region 9a. Thereby, the signal charge is collected and accumulated in the potential energy well of the third semiconductor region 9b. As described above, here, a potential energy gradient is formed with respect to the light receiving part 2.

While charge transfer signals out of phase with each other by 180 degrees are applied to the transfer electrode TX1 and the transfer electrode TX2, a ground potential is applied to the transfer electrode TX5. Therefore, as shown in (c) of FIG. 6, the potential energy $\phi_{TX3}$ of the region just below the transfer electrode TX5 is not lowered, and electric charge does not flow into the potential energy wells of the fourth semiconductor regions 11a and 11b.

As described above, the signal charge is collected and accumulated in the potential energy wells of the third semiconductor regions 9a and 9b. The signal charges accumulated in the potential energy wells of the third semiconductor regions 9a and 9b are read out to the outside. Further, in the above-described example, the set of the transfer electrode TX1 and the transfer electrode TX2 has been described, and the same applies to the set of the transfer electrode TX3 and the transfer electrode TX4.

As described above, a state in which a predetermined electric potential is applied to the transfer electrodes TX1 to TX4, and the regions just below the transfer electrodes TX1 to TX4, that is, the transfer gates 4a to 4d, can transfer electric charge to the third semiconductor regions 9a to 9d may be referred to as a charge transfer state. Also, the transfer gates 4a to 4d being in the charge transfer state may be referred to as the transfer gates 4a to 4d being in an ON state.

Next, a discharge operation of unnecessary charge will be described with reference to FIG. 7. A ground potential is applied to the transfer electrode TX1 and the transfer electrode TX2 (further, the transfer electrode TX3 and the transfer electrode TX4). Therefore, as shown in (a) of FIG. 7, potential energies $\phi_{TX1}$ and $\phi_{TX2}$ in the regions just below the transfer electrode TX1 and the transfer electrode TX2 are not lowered, and electric charge does not flow into the potential energy wells of the third semiconductor regions 9a and 9b.

On the other hand, a positive potential is applied to the transfer electrode TX5. In this case, as shown in (b) of FIG. 7, negative charge e generated in the light receiving part 2 flows into the potential energy wells of the fourth semiconductor regions 11a and 11b due to the potential energy $\phi_{TX5}$ of the region just below the transfer electrode TX5 being lowered. As described above, unnecessary charge is collected in the potential energy wells of the fourth semiconductor regions 11a and 11b.

The unnecessary charge collected in the potential energy wells of the fourth semiconductor regions 11a and 11b is discharged to the outside.

As described above, a state in which a predetermined electric potential is applied to the transfer electrodes TX5, and the regions just below the transfer electrodes TX5, that is, the discharge gates 6a and 6b, can transfer electric charge to the fourth semiconductor regions 11a and 11b may be referred to as a charge discharge state. Also, the discharge gates 6a and 6b being in the charge discharge state may be referred to as the discharge gates 6a and 6b being in an ON state.

The optical sensor 50 includes a reset transistor (not illustrated) provided in the pixel 51. When a reset voltage is applied to the reset transistor, reset processing is executed. The reset voltage is a positive voltage with an electric potential of the photogate electrode PG as a reference. Thereby, the electric charge accumulated in the third semiconductor regions 9a to 9d and the like serving as the charge accumulation part is discharged to the outside, and it becomes a state in which electric charge is not accumulated.

[Operation of Control Unit]

Figure 8:
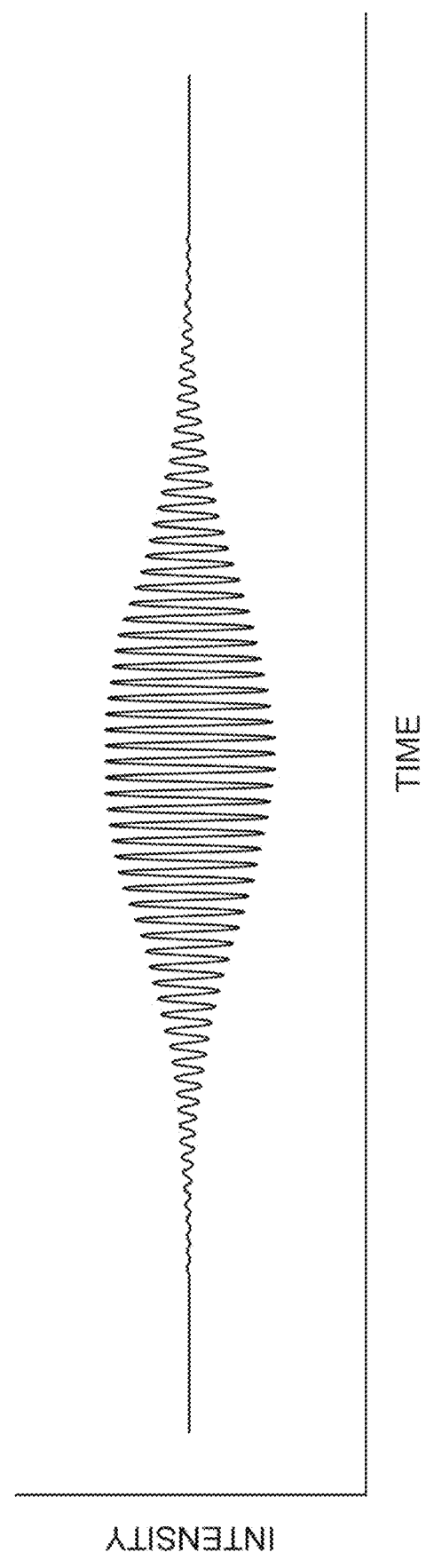
FIG. 8 is a graph showing an interferogram signal of interfering light acquired in each pixel of the optical sensor illustrated in FIG. 1.

FIG. 8 is a graph showing an interferogram signal of the interfering light L10 acquired in each pixel 51 of the optical sensor 50 when the movable mirror 21 is moved in any one direction of the double-headed arrow over a distance longer than a coherence length of the light L0 in the configuration illustrated in FIG. 1. The envelope curve of the interferogram signal represents a structure of the object S in a depth direction. A width of the envelope curve is determined by the coherence length of the light L0 and defines a resolution of the optical coherence tomography device 100 in the depth direction. When driving of the movable mirror 21 is a short-distance reciprocating operation and an operation speed of the movable mirror 21 is constant, a part of a time range is cut off accordingly from the interferogram signal shown in FIG. 8, and the interferogram signal obtained there becomes a signal in a form of reciprocating in terms of time. In the optical coherence tomography device 100, a period of the interferogram signal of the interfering light L10 corresponds to half of a center wavelength (or peak wavelength) of the light L0 emitted from the light source 10. Therefore, the control unit 60 applies an electric signal to each pixel 51 of the optical sensor 50 so that the four transfer gates 4a, 4b, 4c, and 4d are sequentially brought into the charge transfer state in four time ranges separated from each other and the plurality of discharge gates 6a and 6b are simultaneously brought into the charge discharge state in a time range other than the four time ranges for each period of the interferogram signal of the interfering light L10.

Figure 9:
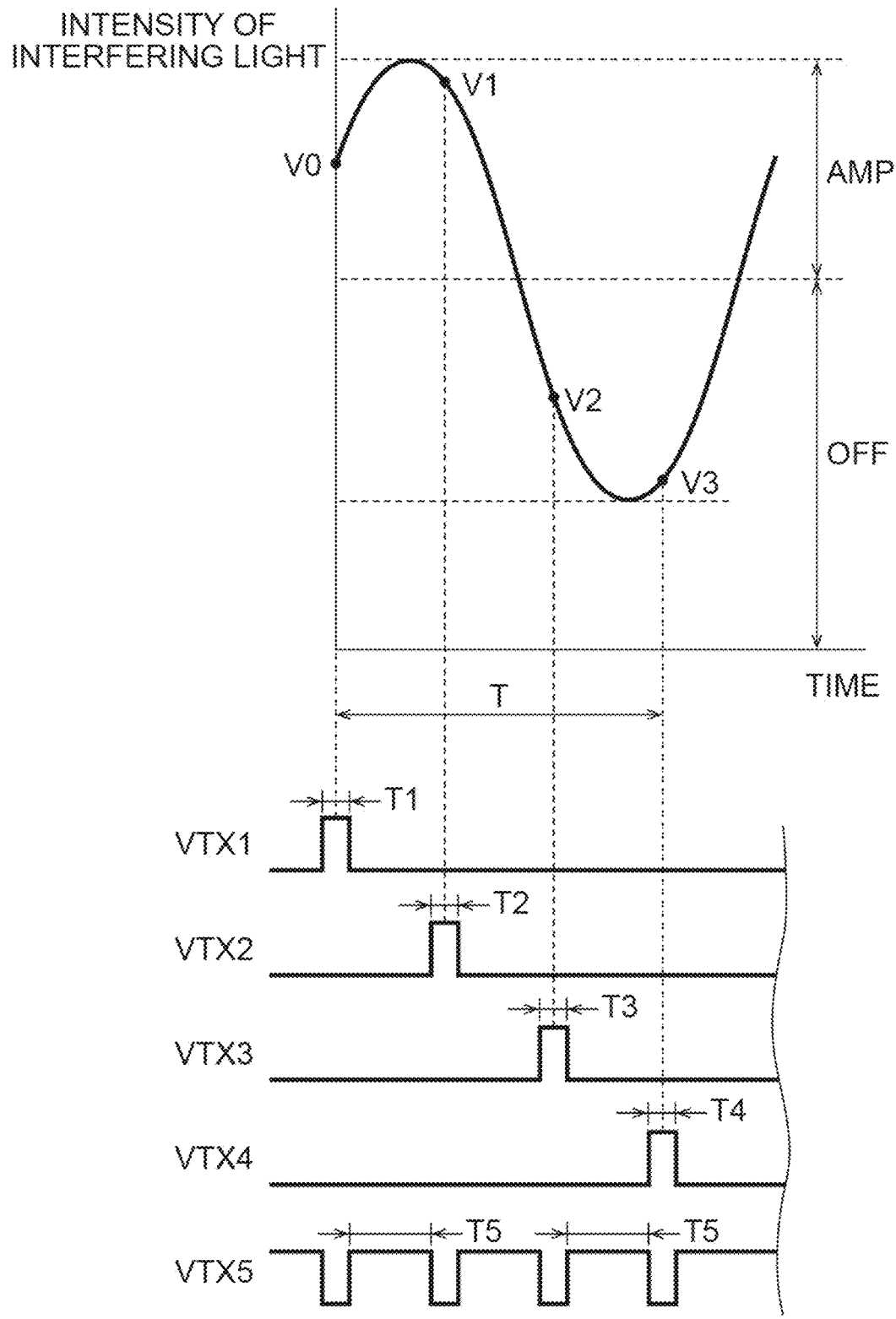
FIG. 9 is a timing chart of an electric signal applied to each pixel of the optical sensor illustrated in FIG. 1.

Hereinafter, an electric signal applied to each pixel 51 of the optical sensor 50 will be described in more detail with a period of the interferogram signal of the interfering light L10 being T. FIG. 9 is a timing chart of an electric signal applied to each pixel 51 of the optical sensor 50.

An electric signal VTX1 is an electric signal applied to the transfer electrode TX1 and is an electric signal that brings the transfer gate 4a into the charge transfer state (ON state) in a time range T1 (<t/4) repeated in the period T. The electric signal VTX2 is an electric signal applied to the transfer electrode TX2 and is an electric signal that brings the transfer gate 4b into the charge transfer state (ON state) in a time range T2 (<t/4) repeated in the period T. A phase of the electric signal VTX2 is delayed by T/4 with respect to that of the electric signal VTX1.

The electric signal VTX3 is an electric signal applied to the transfer electrode TX3 and is an electric signal that brings the transfer gate 4c into the charge transfer state (ON state) in a time range T3 (<t/4) repeated in the period T. A phase of the electric signal VTX3 is delayed by T/4 with respect to that of the electric signal VTX2. The electric signal VTX4 is an electric signal applied to the transfer electrode TX4 and is an electric signal that brings the transfer gate 4d into the charge transfer state (ON state) in a time range T4 (<t/4) repeated in the period T. A phase of the electric signal VTX4 is delayed by T/4 with respect to that of the electric signal VTX3.

The electric signal VTXS is an electric signal applied to the plurality of discharge gates 6a and 6b at the same time and is an electric signal that brings the plurality of discharge gates 6a and 6b into the charge discharge state (ON state) in a time range other than the time ranges T1, T2, T3, and T4 (in other words, a time range T5 repeated in the period T/4). Further, the time ranges T1, T2, T3, and T4 each have the same length. Also, the time ranges T1, T2, T3, and T4 are each smaller than the time range T5.

The control unit 60 acquires four intensities V0, V1, V2, and V3 of the interfering light L10 in each period T of the interferogram signal of the interfering light L10 by applying the above electric signals VTX1, VTX2, VTX3, VTX4, and VTX5 to each pixel 51 of the optical sensor 50. The control unit 60 acquires $$\text{AMP component} = [\{(V3-V1)^2 + (V2-V0)^2\}^{1/2}]/2$$

$$\text{OFF component} = (V0+V1+V2+V3)/4$$

in each period T of the interferogram signal of the interfering light L10 on the basis of the four acquired intensities V0, V1, V2, and V3 of the interfering lights L10. Thereby, the control unit 60 can reproduce an envelope curve of the interferogram signal of the interfering light L10 for each pixel 51 of the optical sensor 50 with high accuracy and generate an image (tomographic image) of the object S with high accuracy.

[Operation and Effects]

In the optical coherence tomography device 100, when the movable mirror 21 is reciprocated, a temporal change of an interferogram signal is made periodic, and conversion of the interferogram signal into an envelope curve is facilitated. Then, in each pixel 51 included in the optical sensor 50, the plurality of transfer gates 4a, 4b, 4c, and 4d are sequentially brought into the charge transfer state in four time ranges separated from each other and the discharge gates 6a and 6b are simultaneously brought into the charge discharge state in a time range other than the four time ranges for each period of the interferogram signal of the interfering light L10. Thereby, only the electric charge generated in the light receiving part 2 can be acquired as a signal charge in each of the four time ranges. Therefore, according to the optical coherence tomography device 100, an envelope curve of the interferogram signal of the interfering light L10 can be acquired with high accuracy. The acquisition of the signal charge as described above is particularly effective when a speed of the reciprocating operation of the movable mirror 21 is not constant and the interferogram signal of the interfering light L10 has an asymmetrical shape.

In the optical coherence tomography device 100, the movable mirror 21 performs the reciprocating operation by resonating in the mirror device 20. Thereby, the interferogram signal of the interfering light L10 can be acquired at high speed. Also, a speed of the reciprocating operation of the movable mirror 21 does not become constant due to the resonance operation of the movable mirror 21, but even in that case, an envelope curve of the interferogram signal of the interfering light L10 can be acquired with high accuracy as described above.

In the optical coherence tomography device 100, the movable mirror 21 performs a reciprocating operation at a frequency of 1 kHz or higher. Thereby, the interferogram signal of the interfering light L10 can be acquired at high speed. Also, when the movable mirror 21 performs the reciprocating operation at a frequency of 1 kHz or higher, a speed of the reciprocating operation of the movable mirror 21 does not easily become constant, but even in that case, an envelope curve of the interferogram signal of the interfering light L10 can be acquired with high accuracy as described above. Further, when the movable mirror 21 performs the reciprocating operation at a frequency of lower than 1 kHz, the interferogram signal of the interfering light L10 can be converted into an envelope curve thereof by digitizing a two-dimensional image using a normal two-dimensional sensor (high-speed camera, or the like) and then performing image processing. However, when the movable mirror 21 performs the reciprocating operation at a frequency of 1 kHz or higher, it is difficult to convert the interferogram signal of the interfering light L10 into an envelope curve thereof using a normal two-dimensional sensor (high-speed camera or the like).

In the optical coherence tomography device 100, the plurality of pixels 51 are disposed two-dimensionally. Thereby, an image of a predetermined region of the object S can be generated at once. Further, in such a case in which the interfering light L10 is detected by a single PD, the interferogram signal of the interfering light L10 can be converted into an envelope curve thereof by performing digital signal processing after AD conversion of waveform data at high speed. However, in such a case in which the interfering light L10 is detected by a plurality of PDs disposed two-dimensionally, it is difficult to process the waveform data at high speed and convert the interferogram signal of the interfering light L10 into an envelope curve thereof.

In the optical coherence tomography device 100, the mirror device 20 is a MEMS mirror device. Thereby, the movable mirror 21 can be reciprocated at high speed.

In the optical coherence tomography device 100, each pixel 51 includes the photogate electrode PG. Thereby, since the electric charge generated in the light receiving part 2 can be transferred and discharged at high speed, an image of the object S can be generated in a short period of time. That is, since an envelope curve of the interferogram signal of the interfering light L10 can be acquired at high speed, an image of the object S can be generated as an instantaneous image. An image of the object S being able to be generated as an instantaneous image is extremely effective when, for example, the object S is conveyed by the support part 30 or the like, and when the object S is a moving body.

[Modified Example]

The present disclosure is not limited to the embodiment described above. For example, the time ranges T1, T2, T3, and T4 have the same length as each other in the above-described embodiment, but the time ranges T1, T2, T3, and T4 may not have the same length as each other. In the above-described embodiment, a start timing of the time range T5 in which the discharge gates 6a and 6b are in the charge discharge state has been configured to match an end timing of each of the time ranges T1, T2, T3 and T4 in which each of the transfer gates 4a, 4b, 4c, and 4d is in the charge transfer state, but when the end timing of the time range T5 matches the start timing of each of the time ranges T1, T2, T3, and T4, the start timing of the time range T5 may be delayed from the end timing of each of the time ranges T1, T2, T3, and T4.

The control unit 60 may apply an electric signal to the optical sensor 50 so that the plurality of transfer gates (at least two of the transfer gates 4a, 4b, 4c, and 4d) are sequentially brought into the charge transfer state in at least three time ranges separated from each other and the discharge gate (at least one of the discharge gates 6a and 6b) is brought into the charge discharge state in a time range other than the at least three time ranges for each period of the interferogram signal of the interfering light L10.

The reason why the interferogram signal of the interfering light L10 can be reproduced if electric charge is acquired in at least three time ranges separated from each other for each period of the interferogram signal of the interfering light L10 is as follows. First, an interferogram signal I of the interfering light L10 can be represented by a sine function of a phase difference. That is, it can be represented as $I=A+B\cdot\cos\phi$. Here, a center wavelength of the light L0 is set to $\lambda$. For example, it is assumed that the mirror device 20 performs a reciprocating operation of sinusoidal vibration with a maximum displacement amount L and an angular frequency ω. At this time, $\phi=(2\pi/\lambda)\cdot L\cdot\sin(\omega t)+\phi_0$. Further, for example, when $L=\lambda/2$, then $$I=A+B\cdot\cos\{\pi\cdot\sin(\omega t)+\phi_0\}$$

is established. In the above expression, since the unknowns are A, B, and $\phi_0$, if the electric charge is acquired in at least three time ranges separated from each other for each period of the interferogram signal of the interfering light L10, a value of B representing the envelope curve can be reproduced from the interferogram signal of the interfering light L10.

Each of at least three time ranges (for example, four time ranges) in which electric charge is acquired in each period of the interferogram signal of the interfering light L10 may be a time range centered on a time at which a phase of the interferogram signal of the interfering light L10 is shifted by $\pi/2$. According to this, a calculation for converting the interferogram signal of the interfering light L10 into an envelope curve thereof can be simplified. Due to simplification of the calculation, some or all of the calculation can be realized by hardware, and this can contribute to overall high-speed processing. For example, in $I=A+B\cdot\cos\phi$ described above, assuming that an initial phase is $\phi_0$, and I when the phase is shifted by 0, $\pi/2$, $\pi$, and $3\pi/2$ from the initial phase is $I_0$, $I_{\pi/2}$, $I_\pi$, and $I_{3\pi/2}$, respectively, the followings are established.

$$I_0 A+B\cdot\cos(0+\phi_0)=A+B\cdot\cos\phi_0$$

$$I_{\pi/2}=A+B\cdot\cos(\pi/2+\phi_0)=A-B\cdot\sin\phi_0$$

$$I_\pi=A+B\cdot\cos(\pi+\phi_0)=A-B\cdot\cos\phi_0$$

$$I_{3\pi/2}=A+B\cdot\cos(3\pi/2+\phi_0)=A+B\cdot\sin\phi_0$$

Therefore, $I_0-I_\pi=2B\cdot\cos\phi_0$ and $I_{3\pi/2}-I_{\pi/2}=2B\cdot\sin\phi_0$ can be derived, and B can be obtained from a sum of squares thereof.

Figure 10:
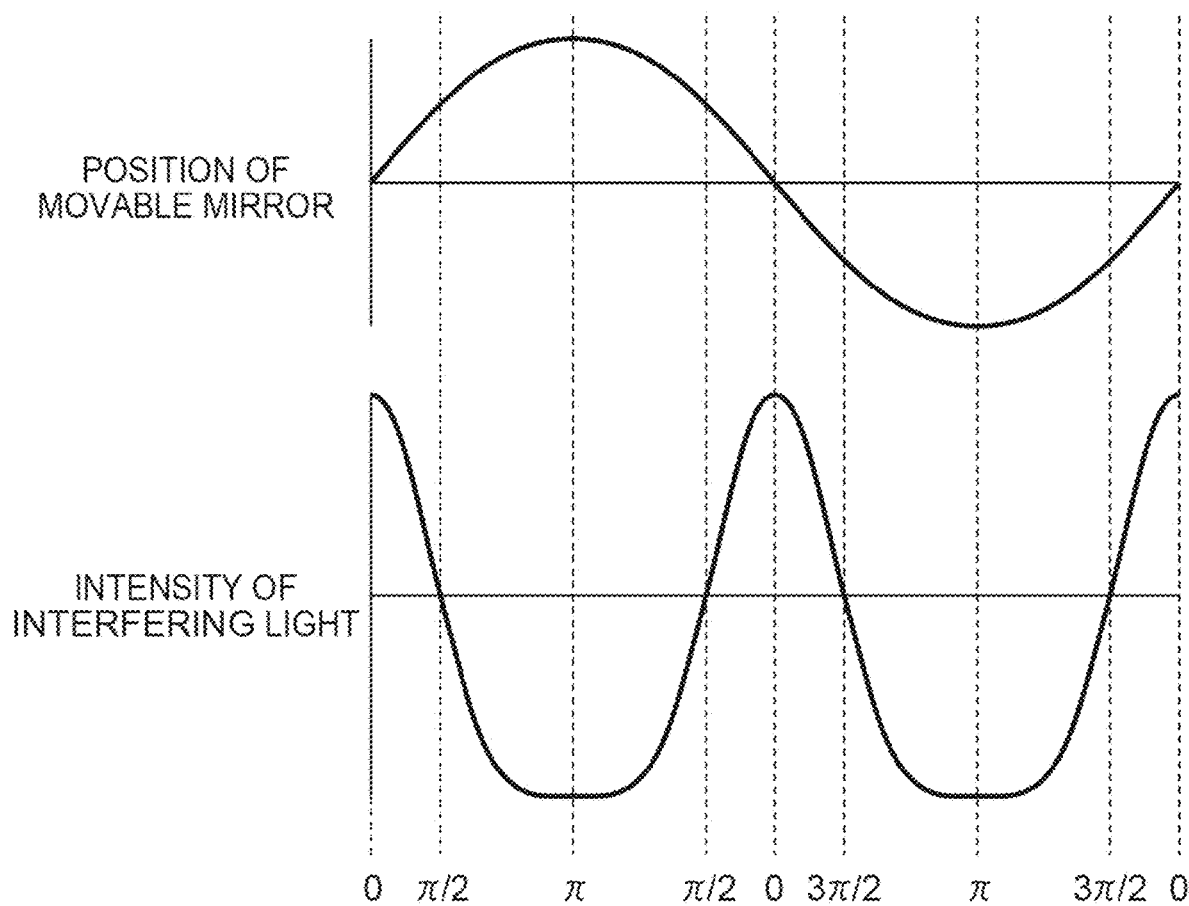
FIG. 10 is a graph showing a relationship between a temporal change of a position of the movable mirror and a temporal change of an intensity of interfering light.
Figure 11:
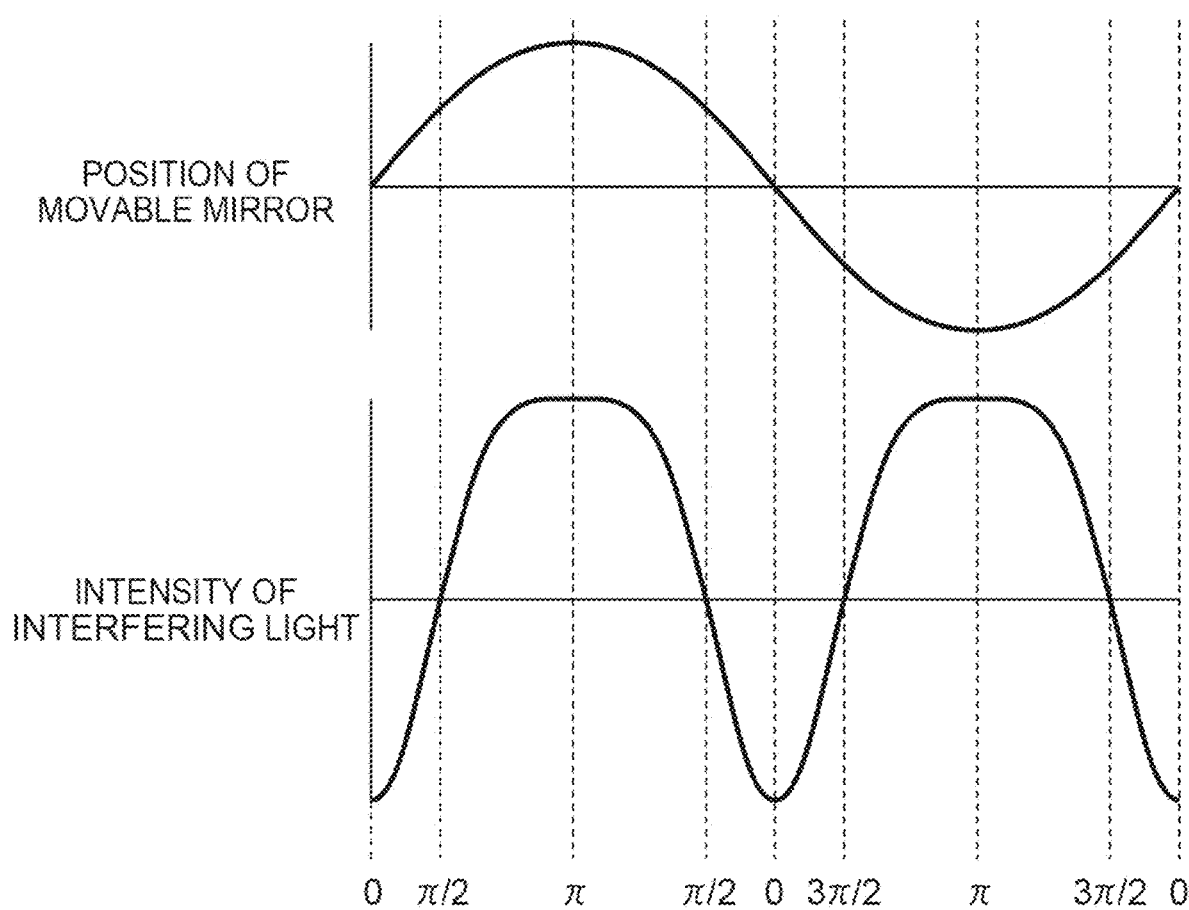
FIG. 11 is a graph showing a relationship between a temporal change of a position of the movable mirror and a temporal change of an intensity of interfering light.
Figure 12:
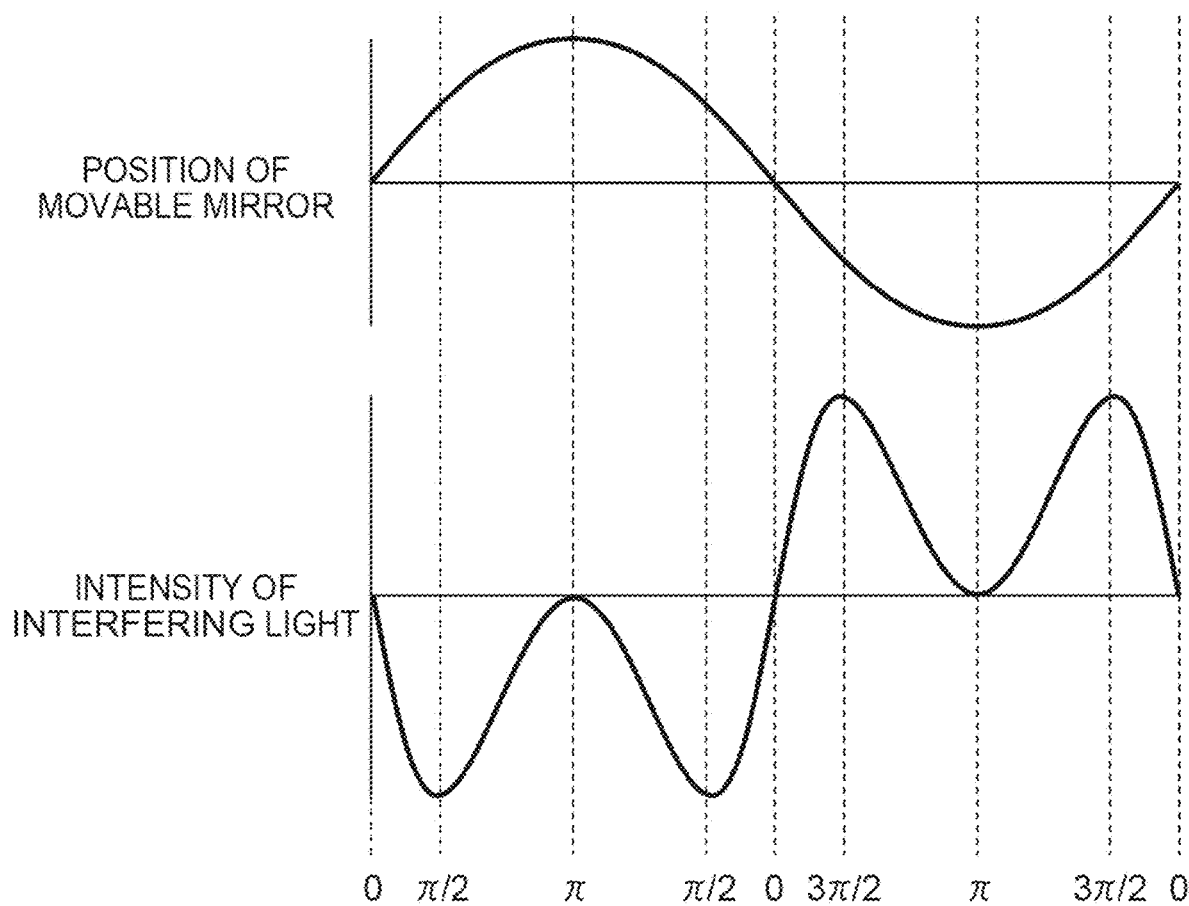
FIG. 12 is a graph showing a relationship between a temporal change of a position of the movable mirror and a temporal change of an intensity of interfering light.
Figure 13:
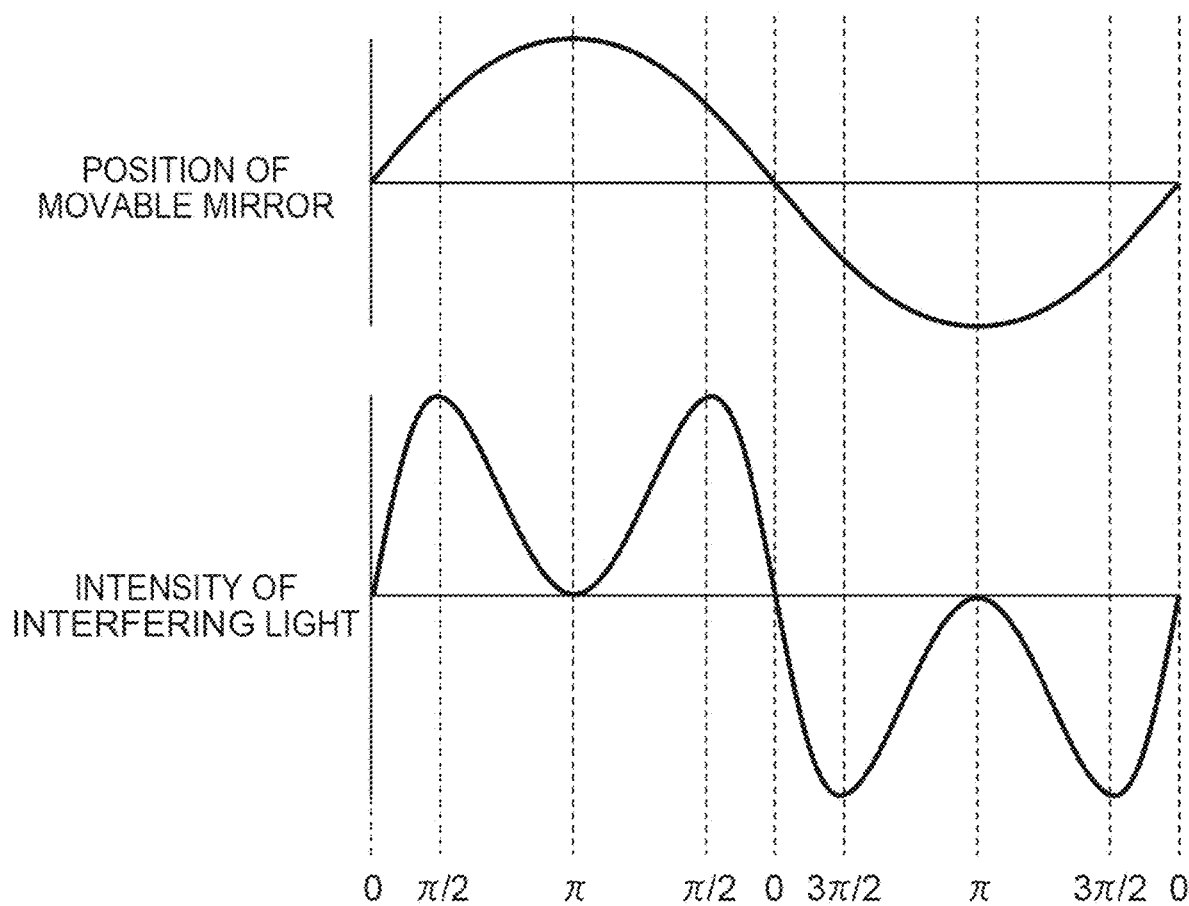
FIG. 13 is a graph showing a relationship between a temporal change of a position of the movable mirror and a temporal change of an intensity of interfering light.

FIG. 10 is a graph showing a relationship between "a temporal change at a position of the movable mirror 21" and "a temporal change in intensity of the interfering light L10 when the initial phase $\phi_0=0$" FIG. 11 is a graph showing a relationship between "a temporal change at a position of the movable mirror 21" and "a temporal change in intensity of the interfering light L10 when the initial phase $\phi_0=\pi/2$." FIG. 12 is a graph showing a relationship between "a temporal change at a position of the movable mirror 21" and "a temporal change in intensity of the interfering light L10 when the initial phase $\phi_0=\pi$." FIG. 13 is a graph showing a relationship between "a temporal change at a position of the movable mirror 21" and "a temporal change in intensity of the interfering light L10 when the initial phase $\phi_0 3\pi/2$."

In any of the cases shown in FIGS. 10, 11, 12, and 13, when each of the four time ranges for acquiring electric charge is a time range centered on a time at which the phase is shifted by $\pi/2$, an acquisition of electric charge is not performed at regular time intervals. Even in such a case, since the optical coherence tomography device 100 acquires electric charge in the four time ranges separated from each other for each period of the interferogram signal of the interfering light L10, an envelope curve of the interferogram signal of the interfering light L10 can be acquired with high accuracy.

For example, when one period of the interferogram signal of the interfering light L10 is divided into four time ranges (continuous time ranges) and electric charge is integrated and acquired in each of the time ranges (that is, when all the electric charge is acquired as the signal charge without performing discharge of the electric charge at all), the interferogram signal of the interfering light L10 cannot be accurately converted into an envelope curve thereof when, for example a speed of the reciprocating operation of the movable mirror 21 is not constant, or an acquisition of electric charge is not performed at regular time intervals (in the latter case, even if the speed of the reciprocating operation of the movable mirror 21 is constant). According to the optical coherence tomography device 100, in any case, an envelope curve of the interferogram signal of the interfering light L10 can be acquired with high accuracy.

Figure 14:
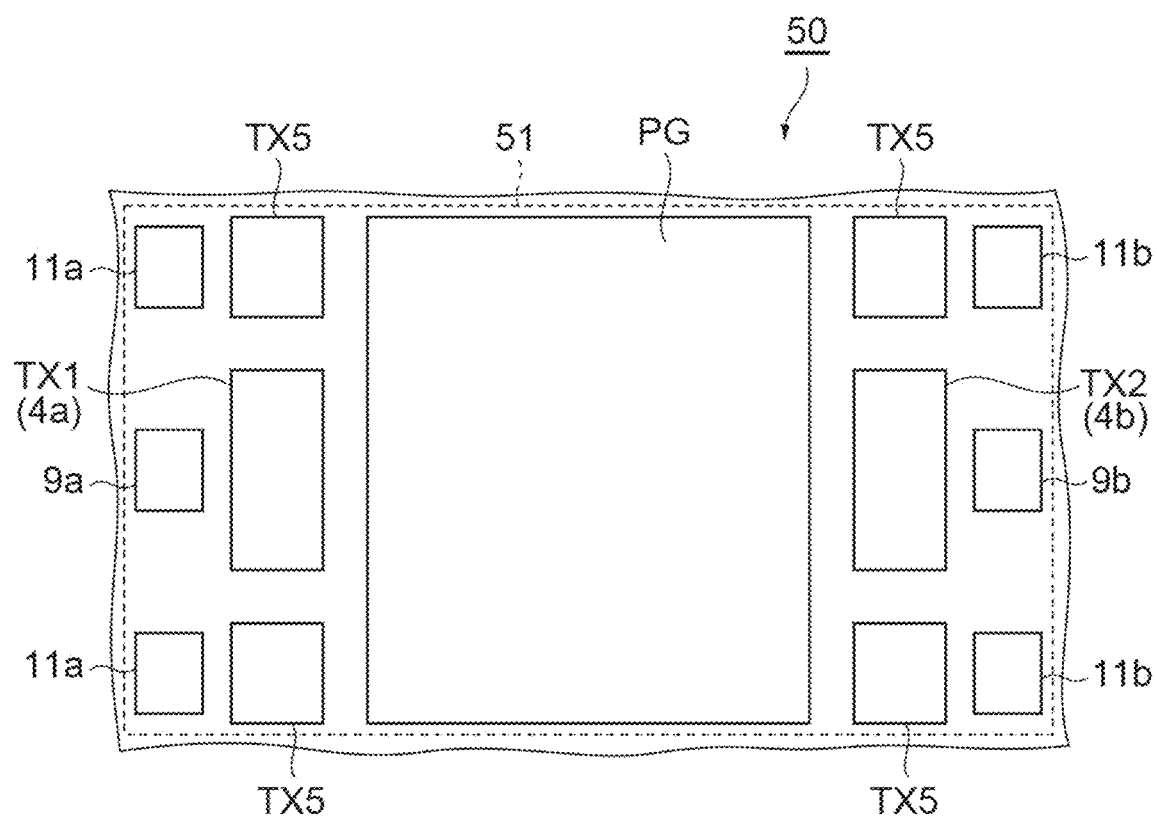
FIG. 14 is a plan view of a pixel of an optical sensor of a modified example.

In the optical sensor 50, each pixel 51 may include two transfer gates 4a and 4b as illustrated in FIG. 14 (two transfer electrodes TX1 and TX2 corresponding to two transfer gates 4a and 4b are illustrated in FIG. 14). That is, each pixel 51 may include a plurality of transfer gates. In the optical sensor 50, the plurality of pixels 51 may be disposed one-dimensionally. The mirror device 20 may be one in which the movable mirror 21 is reciprocated by a magnetic force, or one in which the movable mirror 21 is reciprocated by a drive source such as a piezo actuator. According to the present disclosure, an envelope curve of an interferogram signal of interfering light can be acquired with high accuracy in the optical coherence tomography device including a mirror device whose operation speed of the movable mirror is not constant. At this time, if an amount of movement of the movable mirror is distorted with respect to a control signal, this can be easily compensated by adjusting each time range, that allows each transfer gate of the optical sensor to be in the charge transfer state, in accordance with the distortion of the amount of movement of the movable mirror.

In the above-described optical sensor 50, a photogate structure has been exemplified as the light receiving part 2. However, the light receiving part 2 is not limited to the photogate structure and may have another structure. As an example, as illustrated in (a) of FIG. 15, the light receiving part 2 may have an embedded PD structure. In this case, the light receiving part 2 is configured by a p+-type semiconductor region 2B provided in the second semiconductor region 5 on the second main surface 1b side, and an n-type semiconductor region 2A provided in the second semiconductor region 5 just below the semiconductor region 2B.

Figure 15:
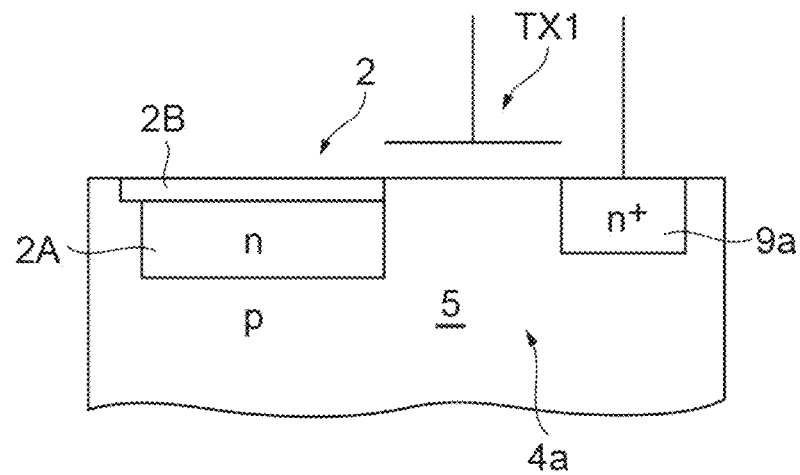
FIG. 15 is a view for explaining a light receiving part of the optical sensor of the modified example.
Figure 15:
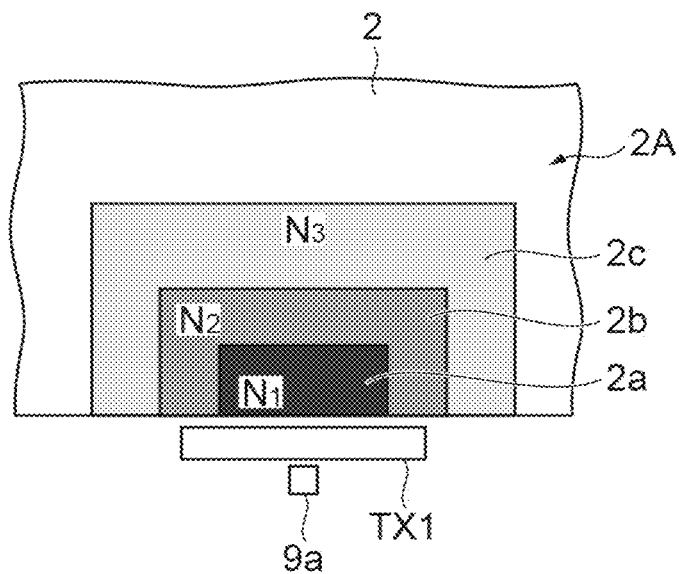
Figure 15:
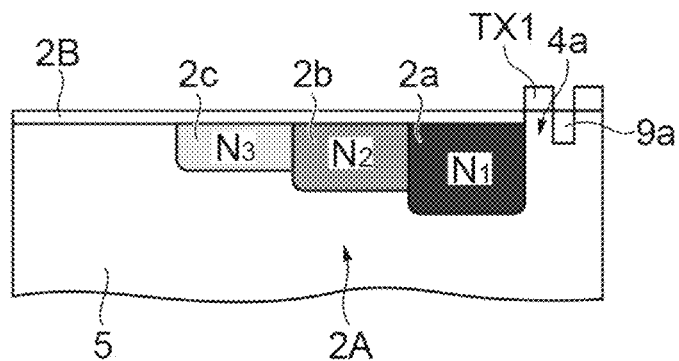

In this case also, a potential energy gradient can be provided in the light receiving part 2 to perform high-speed charge transfer. As an example of the configuration for that purpose, as illustrated in (b) and (c) of FIG. 15, a configuration in which the n-type semiconductor region 2A includes, for example, a plurality (here, three) of n-type semiconductor regions 2a, 2b, and 2c disposed so that an impurity concentration increases toward the transfer gate 4a, and thereby forming an electric field gradient can be exemplified. Further, (b) of FIG. 15 is a schematic cross-sectional view, and (c) of FIG. 15 is a plan view.

Figure 16:
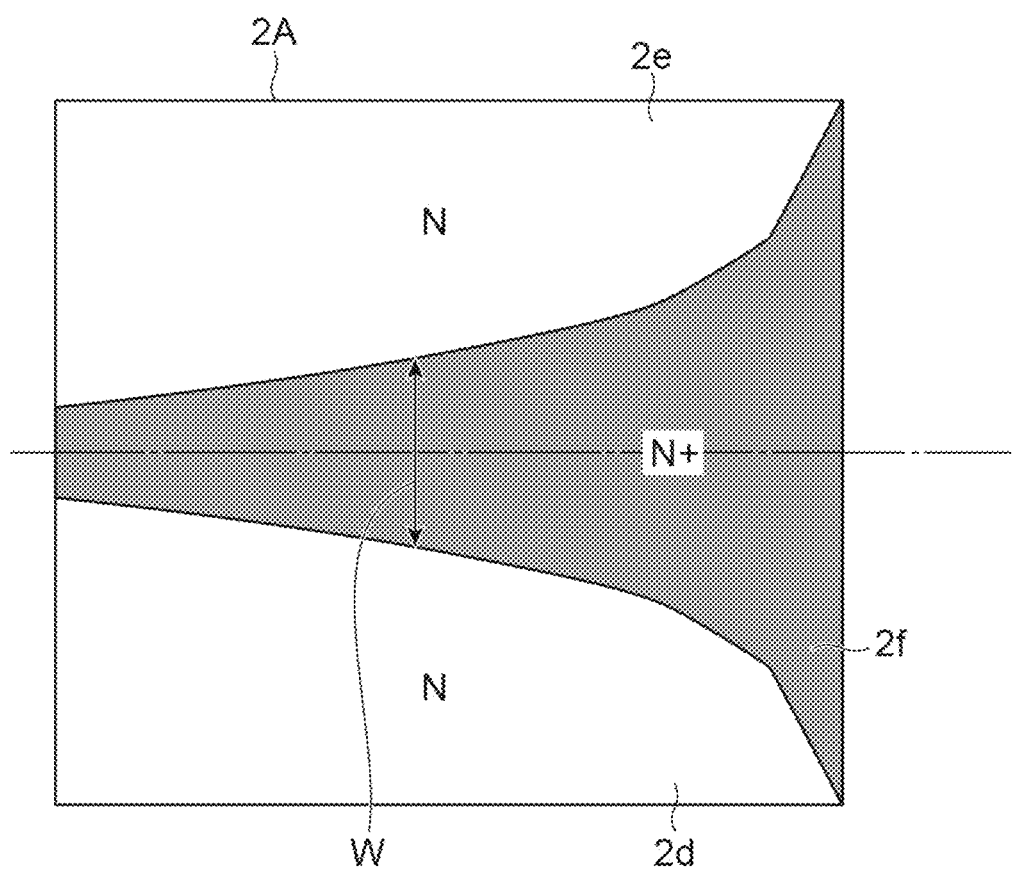
FIG. 16 is a diagram for explaining the light receiving part of the optical sensor of the modified example.

As a configuration for providing a potential energy gradient in the light receiving part 2, as illustrated in FIG. 16, a configuration in which the n-type semiconductor region 2A includes a pair of n-type semiconductor regions 2d and 2e, and an n+-type semiconductor region 2f that is sandwiched between the semiconductor regions 2d and 2e and whose width W extends toward, for example, the transfer gate 4a, and thereby forming an electric field gradient can be exemplified. Further, FIG. 16 is a plan view from the second main surface 1b side.

Various materials and shapes can be applied to each configuration in the embodiment described above without being limited to the above-described materials and shapes. Also, each configuration in one embodiment or modified example described above can be arbitrarily applied to each configuration in another embodiment or modified example.

REFERENCE SIGNS LIST

100: optical coherence tomography device, 2: light receiving part, 4a, 4b, 4c, 4d: transfer gate, 6a, 6b: discharge gate, 10: light source, 20: mirror device, 21: movable mirror, 30: support part, 40: beam splitter, 50: optical sensor, 51: pixel, PG: photogate electrode, 60: control unit, L0: light, L1: first light, L2: second light, L10: interfering light, S: object.

The invention claimed is:

1. An optical coherence tomography device comprising:
   a light source;
   a mirror device including a movable mirror configured to perform a reciprocating operation;
   a support part configured to support an object;
   a beam splitter configured to generate interfering light by splitting light emitted from the light source into first light and second light and combining the first light reflected by the movable mirror and the second light reflected by the object;
   an optical sensor configured to detect the interfering light generated by the beam splitter; and
   a control unit electrically connected to at least the optical sensor, wherein
   the optical sensor includes a plurality of pixels,
   each of the plurality of pixels includes a light receiving part configured to generate electric charge due to incident light, a plurality of transfer gates configured to transfer the electric charge generated in the light receiving part, and a discharge gate configured to discharge the electric charge generated in the light receiving part, and
   the control unit applies an electric signal to the optical sensor so that the plurality of transfer gates are sequentially brought into a charge transfer state in at least three time ranges separated from each other and the discharge gate is brought into a charge discharge state in a time range other than the at least three time ranges for each period of an interferogram signal of the interfering light.

2. The optical coherence tomography device according to claim 1, wherein the movable mirror is configured to perform a reciprocating operation by resonating in the mirror device.

3. The optical coherence tomography device according to claim 1, wherein the movable mirror is configured to perform a reciprocating operation at a frequency of 1 kHz or higher.

4. The optical coherence tomography device according to claim 1, wherein the plurality of pixels are disposed two-dimensionally.

5. The optical coherence tomography device according to claim 1, wherein the mirror device is a MEMS mirror device.

6. The optical coherence tomography device according to claim 1, wherein each of the plurality of pixels further includes a photogate electrode configured to attract the electric charge generated in the light receiving part to the plurality of transfer gates and the discharge gate side.

7. The optical coherence tomography device according to claim 1, wherein each of the at least three time ranges is a time range centered on a time at which a phase of the interferogram signal is shifted by $\pi/2$.

* * * * *